(12) United States Patent
Bicknell et al.

(10) Patent No.: US 7,222,330 B2
(45) Date of Patent: *May 22, 2007

(54) PROJECT PLANNING SYSTEM WITH CONTENT LOADED PROJECT PLANNING TEMPLATE GENERATOR AND A PLURALITY OF CONTENT LOADED PROJECT PLANNING TEMPLATES

(76) Inventors: Barbara A. Bicknell, 4864 S. Johnson St., Littleton, CO (US) 80123; Kris D. Bicknell, 4864 S. Johnson St., Littleton, CO (US) 80123

( * ) Notice: Subject to any disclaimer, the term of this patent is extended or adjusted under 35 U.S.C. 154(b) by 539 days.

This patent is subject to a terminal disclaimer.

(21) Appl. No.: 10/152,751

(22) Filed: May 22, 2002

(65) Prior Publication Data

US 2002/0184071 A1 Dec. 5, 2002

Related U.S. Application Data

(63) Continuation of application No. 09/889,074, filed as application No. PCT/US00/00987 on Jan. 14, 2000, now abandoned.

(60) Provisional application No. 60/116,123, filed on Jan. 15, 1999.

(51) Int. Cl.
*G06F 9/44* (2006.01)

(52) U.S. Cl. .................. 717/101; 715/507; 705/8

(58) Field of Classification Search ............... 717/101; 345/751; 705/36, 8; 715/507
See application file for complete search history.

(56) References Cited

U.S. PATENT DOCUMENTS

| | | | |
|---|---|---|---|
| 5,671,415 A * | 9/1997 | Hossain | 717/101 |
| 5,729,746 A * | 3/1998 | Leonard | 717/101 |
| 5,812,849 A * | 9/1998 | Nykiel et al. | 717/101 |
| 5,860,005 A * | 1/1999 | Inoue | 717/101 |
| 6,145,119 A | 11/2000 | House et al. | |
| 6,223,343 B1 | 4/2001 | Hopwood et al. | |
| 6,233,493 B1 | 5/2001 | Cherneff et al. | |
| 6,381,743 B1 * | 4/2002 | Mutschler, III | 717/104 |
| 6,405,364 B1 * | 6/2002 | Bowman-Amuah | 717/101 |
| 6,502,234 B1 | 12/2002 | Gauthier et al. | |
| 6,513,154 B1 * | 1/2003 | Porterfield | 717/101 |
| 6,519,763 B1 * | 2/2003 | Kaufer et al. | 717/101 |
| 6,567,814 B1 | 5/2003 | Bankier et al. | |
| 6,571,215 B1 * | 5/2003 | Mahapatro | 705/8 |

(Continued)

OTHER PUBLICATIONS

Productive Objects An applied Software Project Management Framework, Robert J. Muller, Aug. 1, 1997, Whole book.*

(Continued)

*Primary Examiner*—Todd Ingberg
(74) *Attorney, Agent, or Firm*—Townsend and Townsend and Crew LLP

(57) ABSTRACT

A product development system having application with respect to products and services across multiple industries and markets which reduces development time and increases probability of product or service success. The invention focuses on apparatus and methods of integrating sufficient information into product development cycles to help ensure successful product creation, and to help ensure that the product development cycle may be successfully repeated with respect to the development of additional products and services. A computer implement product planning tool provides a main project planning application having a hierarchical product planning architecture configured to be interactive with project planning tool user.

237 Claims, 29 Drawing Sheets

U.S. PATENT DOCUMENTS

| | | | | |
|---|---|---|---|---|
| 6,601,233 | B1 * | 7/2003 | Underwood | 717/102 |
| 6,658,643 | B1 * | 12/2003 | Bera | 717/101 |
| 6,714,915 | B1 * | 3/2004 | Barnard et al. | 705/7 |
| 6,718,535 | B1 * | 4/2004 | Underwood | 717/101 |
| RE38,633 | E * | 10/2004 | Srinivasan | 707/10 |

OTHER PUBLICATIONS

Boehm, Barry W., "Software Engineering Economics", 1981, pp. 35-55, 591-638, Prentice-Halll, Inc., Englewood Cliffs, New Jersey.

Fairley, Richard E., "Software Engineering Concepts", 1985, pp. 1-87, McGraw-Hill.

Barbara A. Bicknell, Kris D. Bicknell, "The Road Map to Repeatable Success", 1995, CRC Press.

MICROSOFT, "User's Guide for the Microsoft Project for Windows 95 and Windows 3.1", 1995, pp. 1-270.

C. Weber et al., "Key Practices of the Capability Maturity Model", Software Engineering Institute, Aug. 1991, pp. L2-17 to L2-40.

"Choas Report", Standish Group International, Inc., original date unknown, West Yarmouth, MA.

Lotus Corp., "Developing Notes Applications using Lotus Components", 1996, pp. 1-132.

Abbie Griffin, "PDMA Research on New Product Development Practices: Updating Trends and Benchmarking Best Practices", 1997, J. Prod. Innov. Manag. vol. 14, 429-458.

"Defining Next-Generation Products: An Inside Look—How Leading High-Tech Companies Successfully Develop Nev. Products", Harvard Business Review, Nov.-Dec. 1997, pp. 116-124.

"USC COCOMOII Reference Manual", pp. 1-85, University of Southern California, 1999.

* cited by examiner

FIG. 13

PROJECT PLANNING SYSTEM WITH CONTENT LOADED PROJECT PLANNING TEMPLATE GENERATOR AND A PLURALITY OF CONTENT LOADED PROJECT PLANNING TEMPLATES

This application is a continuation of U.S. patent application Ser. No. 09/889,074, filed on Jul. 11, 2001 now abandoned, which is a 35 U.S.C. §371 application of PCT/US00/00987, filed on Jan. 14, 2000, which claims the benefit of U.S. Provisional Patent Application 60/116,123, filed on Jan. 15, 1999.

I. TECHNICAL FIELD

The present invention relates to a product development system having application with respect to products and services across multiple industries and markets which reduces development time and increases probability of product or service success. The invention focuses on apparatus and methods of integrating sufficient information into product development cycles to help ensure successful product creation, and to help ensure that the product development cycle may be successfully repeated with respect to the development of additional products and services.

II. BACKGROUND ART

The need for getting products to market faster, better and cheaper is growing as product life cycles are shortening, especially in the area of high technology and consumer goods. As such, the need to consider all of the aspects of developing a product, from idea generation through production, and post production product support (and even disposal) is critical. Recent studies and research document that there is a great need for the planning and integration of the various aspects of product production, and that technology to accomplish this integration is absent despite the explosion of database and information storage devices and methods. "PDMA Research on New Product Development Practices: Updating Trends and Benchmarking Best Practices" by Abbie Griffin, J PROD INNOV MANAG 1997: 14:429–458, "Defining Next-Generation—How Leading high-tech Companies Develop New Products", Harvard Business Review, November-December 1997, pg. 116–124, and "PDM's Productivity Payback", by Paula M. Noaker, Integrated Design and Manufacturing November/December, 1997.

A typewriter can't show you how to write a book. Similarly scheduling tools such as Microsoft Project or Project Office can't show the user how to plan and integrate the process of product development. *User's Guide for Microsoft Project 98, Microsoft Press*, Redmond, Washington, 1984–1997. Because these types of scheduling tools typically comprise functional shells with little or no content, they rely on the planning management expertise of the user to conceptualize and integrate the planning and process steps for product development and then budget resources as separate events. The user then memorializes the steps for product development derived from personal expertise by manually entering the planning and process steps along with the allocated resources into the scheduling tool. As such, companies may generate ad hoc approaches to product development that are dependent upon people doing their "best" planning management, which can fail to identify, or tie various process activities or methodologies, and which can fail to provide coherent information transfer throughout the organization.

Because there is a large commercial market for scheduling tools, the manner of providing functional scheduling shells has taken a variety of forms. In spite of the variety of scheduling tools available to the consumer, substantial problems remain unresolved with respect to providing a planning management device which assures repeatably successful integrated product development.

A significant problem with existing scheduling tools is that they are not planning systems. A schedule may be nothing more than a calendar with resources allocated over time. A plan by comparison defines activities to be performed over time, what is deliverable from the activity, and integrates the deliverables with subsequent defined activities. As mentioned above, scheduling tools typically comprise functional shells with little or no content, a plan provides the content. Sophisticated scheduling tools, such as Project Office may integrate and update many individual schedules such as those prepared using Microsoft Project but these tools do not provide a planning system.

A significant problem with existing scheduling tools is they assume that the user knows how to plan and manage a project. This assumption of subject matter expertise which may not exist with respect to coordinating the various aspects of product development may result in a failure of proper requirements identification. Often, rather than identifying the overall organizational requirements for development of a product, users with limited planning management expertise tend to target various solutions in technology and process to isolated problems in the organization. Providing solutions to problems that have narrow focus, however, may fail in the first instance to properly identify all the requirements for product development, and in the second instance may fail to integrate the efforts of the entire organization.

A related problem with existing scheduling tools is that they place the burden of being a lexicographer on the user. However, consistent use of terminology rarely cuts across an entire organization and miscommunication may occur as individuals attempt to interpret terminology within the context of their own specialty area. Moreover, allocation of resources by a user having little subject matter expertise in a specialty may result in incorrect budget allocations based upon incorrect perceptions of the activities performed in particular product development step. Likewise, individuals with varying subject matter expertise may incorrectly draw upon budgeted resources for product development steps when product development steps are defined by generic indicators. Ultimately due to these miscommunications, the scheduling tool may, in-part or in its entirety, lose its usefulness as a baseline for integrating product development events and as tool for comparing the budgeted resources to the real time use of resources.

Another problem with existing scheduling tools is that they may only have a single level of review of product development content or resource estimation or resource allocation. Because the product development content and resource lists remain outside of the project scheduling tool the project scheduling tool may not allow multiple users to use the project scheduling tool as a forum for interactive review and comparison.

Another problem with existing scheduling tools or spreadsheets may be that they provide few metrics for comparing success or failure within the project or across projects. Typically, scheduling tools may compare resource expenditure with the a resources baseline. The reasons for the occurrence of variation from the baseline may remain unknown. This may result from the inability to memorialize various aspects of real time experiences in the product or service production cycle for later review.

Another problem with existing scheduling tools may be that they do not allow for construction of consistent baseline project development plans. Because project planning expertise, subject matter expertise and planning techniques may vary among individuals within an organization, and because project planning may be performed as isolated steps by various members of the organization which may be subsequently integrated by entering the planning details into a project scheduling system, the baselines for the same product in different production cycles or similar products in the same production cycle may have substantial variation.

Another problem with existing scheduling tools may be a lack of product development content. Typically product scheduling tools are functional shells into which the content from separate project planning steps may be added. These types of tools do not provide the user with interactive subject matter expertise about the product being developed, about resources to perform activities, or about the activities themselves. The scheduling tool may not link the details of such content into useful packets of information for the user, or show the user how to create dependency between various aspects of the content. Typically, project scheduling tools calendar resources which are manually input to fields by the project planning user. However, the project scheduling tool or spread sheet formats may not show the user how to plan a project resulting in resources to be entered into these databases external from the project planning.

A related problem may be that existing scheduling tools may not allow product development content to be entered into the functional shell of the project scheduling tool. The functional shell may as a result have little or no product development content to guide the project scheduling user as to how to use calendered resources.

Another problem may be that existing scheduling tools do not provide guidance in assigning dependencies between product development content. Dependencies between product development content are typically determined outside of the project scheduling tool. The project scheduling tool user then enters the dependencies manually into fields within the project scheduling tool.

Another problem may be that existing project scheduling tools may not be loaded with sufficient product development content automatically. A description of resources may be calendered with existing project scheduling tools but links to additional information may not be established.

Another problem may be that product development content which may be loaded automatically to existing project scheduling tools may not automatically load the assigned dependencies between product development content. The dependencies may have to be assigned manually between product development content within the existing project scheduling tools.

Still another problem with existing scheduling tools may be that they are too cumbersome. With respect to some scheduling tools, the number of features, the use of the features, and coming to an understanding of the relationship of the features to one another results in an extended learning period for the user. Over this learning period the user may have various levels of success in correctly and efficiently scheduling task activities.

A related problem is that existing scheduling tools are too labor or time intensive. One aspect of this is previously discussed extended learning curve. A second aspect is that the user must either have or obtain an expertise in project or planning management so that the scheduling tool can be used properly. A third aspect of this problem may be that the user must acquire multi-discipline subject matter expertise before identification, integration and coordination of product development steps may occur. Gaining subject matter expertise requires the expenditure of time to allow sufficient interaction with other persons or through academic achievement.

Another related problem is that the process of both learning to use feature rich scheduling tools, acquiring multiple-discipline subject matter expertise, and obtaining project or planning management expertise is too complicated. This is especially true when getting products to market faster, better and cheaper may be a priority or where the product life cycles may be short.

As to each of these problems of integrated product development, the present invention discloses technology which addresses every one of these problems in a practical fashion.

III. DISCLOSURE OF THE INVENTION

The five modules of the adaptable integrated content product development system may address the problems encountered by organizations in developing products and services. The technology disclosed ties the product development process to the remainder of the operations in the organization that may not be seen as part of the product development cycle. The product development system features disclosed are varied and may be incorporated into processes and used in numerous applications. Naturally, as a result of these several different and potentially independent aspects of the invention, the objects of the invention are quite varied.

A broad object of the invention may be to provide a product development system having application with respect to products and services across multiple industries and markets which reduces development time and increases probability of product or service success.

A second broad object of the invention may be to integrate sufficient information into product development cycles to help ensure successful product creation, and to help ensure that the product development cycle may be successfully repeated with respect to the development of additional products and services.

A third broad object of the invention may be to implement various aspects of the product development system with computer hardware and software. One aspect of providing a computer implemented integrated product development system is to provide computer implement project planning tool which corresponds to the planning module of the invention.

Another object of the invention may be to provide project planning expertise in a main project planning application software. The main project planning application may computer implement any of the five product development modules of the invention. Computer implemented project development modules may provide benefits which are additional objectives of the invention.

An objective of the invention may be to provide computer implemented project planning expertise. One aspect of this objective may be to provide consistency with respect to the application of project planning techniques. This may be with respect to the scope or definition of the project planning techniques. One example may be that project planning lexicon may be standardized through out an organization to reduce miscommunication. A second aspect of this object may be to provide a computer implement tutorial with the information sorted and prioritized into useful categories. A third aspect of this objective may be to provide a consistent product development baseline to which an entire organization may make comparisons. A fourth aspect of this objective may be to allow expertise from multiple disciplines to simultaneously have access to and work on or within the same computer implemented project plan.

Yet another objective of the invention may be to memorialize the application of the product development system so that a history of product development may be later reviewed.

Still another objective of the invention may be to provide a computer implemented metrics for making comparisons of real time product development to projected baselines for product development. Also comparisons of real time product development or projected baselines for product development may be compared to real time product development or projected baselines of different products or services.

Another objective of the invention may be to integrate a computer implement product development plan with other computer implemented tools in external databases. This may involve exporting the data from the product development plan to scheduling tools, electronic calendering tools, electronic spreadsheets and the like.

Another objective of the invention may be to make product development efficient. One aspect of this objective is to provide a computer implemented project planning tool which may augment in-house project planning experience. A second aspect of this objective may be to augment subject matter expertise in the product or service which is being developed. A third aspect of this objective is to automate many aspects of the project planning tool to reduce the number of features which a person may learn to use.

Naturally further objects of the invention may be disclosed throughout other areas of the specification and claims.

IV. BRIEF DESCRIPTION OF THE DRAWINGS

FIG. 13 is a particular embodiment of a content loaded project planning template having a rich text formatting window.

V. MODE(S) FOR CARRYING OUT THE INVENTION

Figure 1:
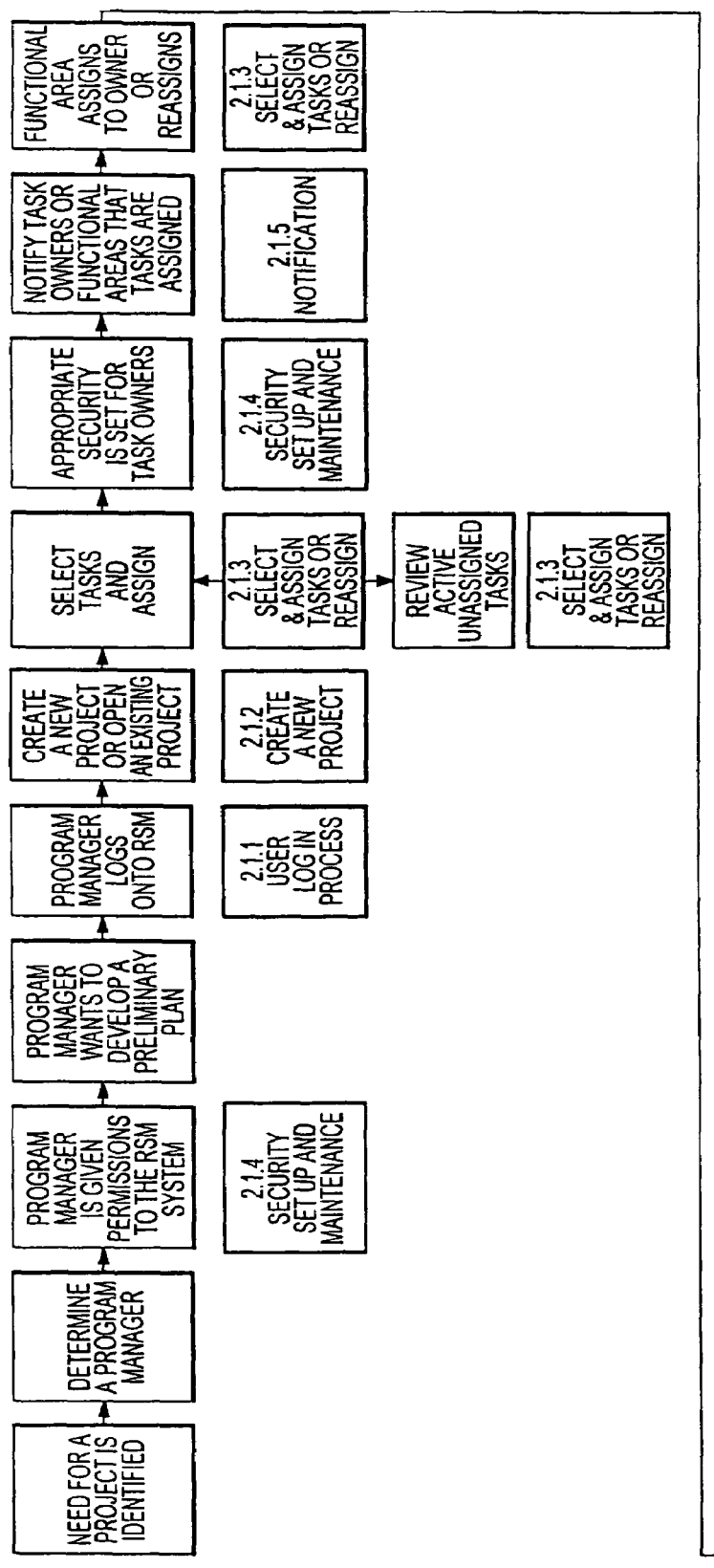
FIG. 1 is a flow diagram of a particular embodiment of the high level operating concept for the project planning module.
Figure 1A:
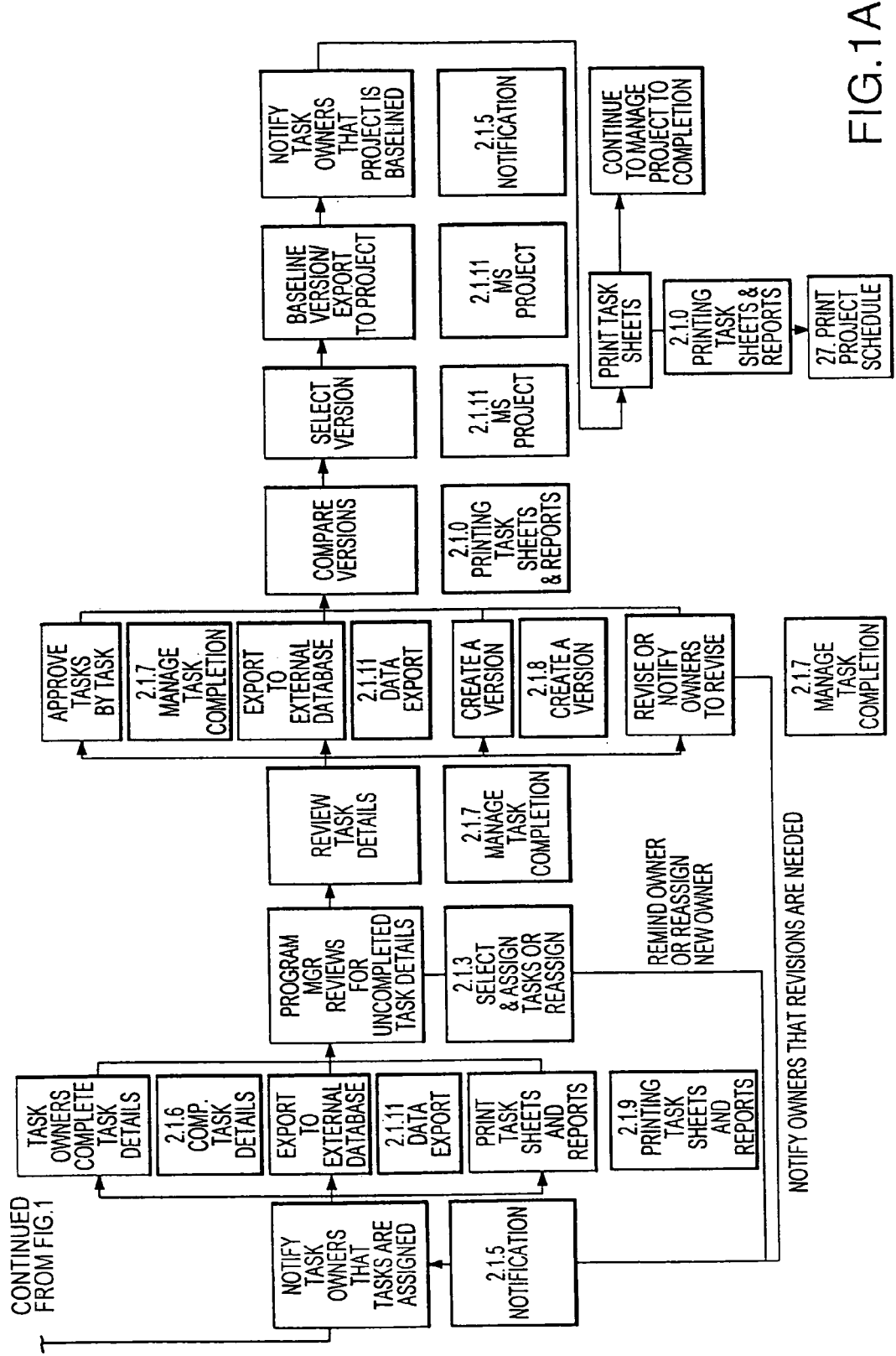
Figure 2:
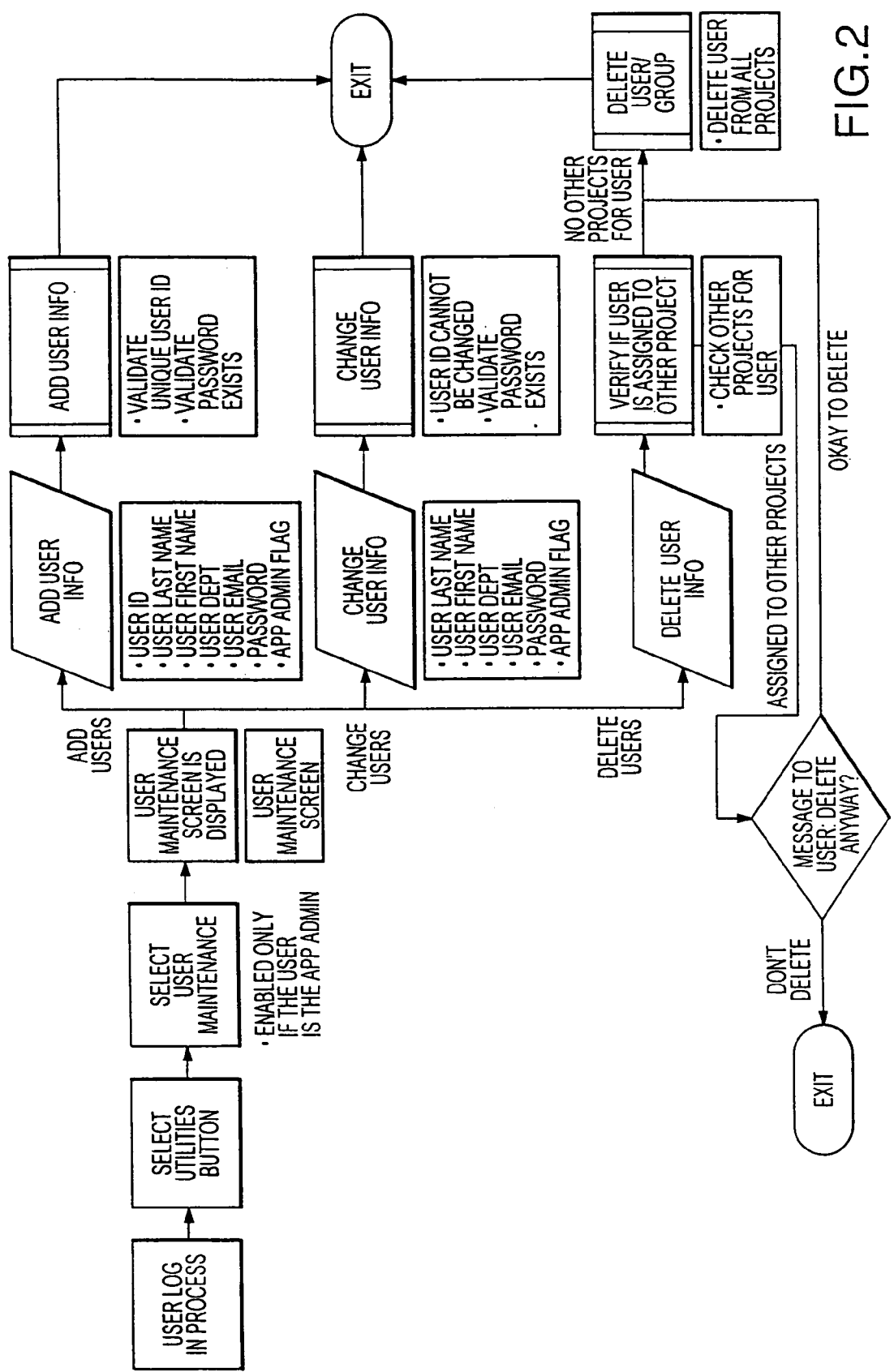
FIG. 2 is a flow diagram of a particular embodiment of the security setup and maintenance subroutine of the computer implemented project planning tool.
Figure 3:
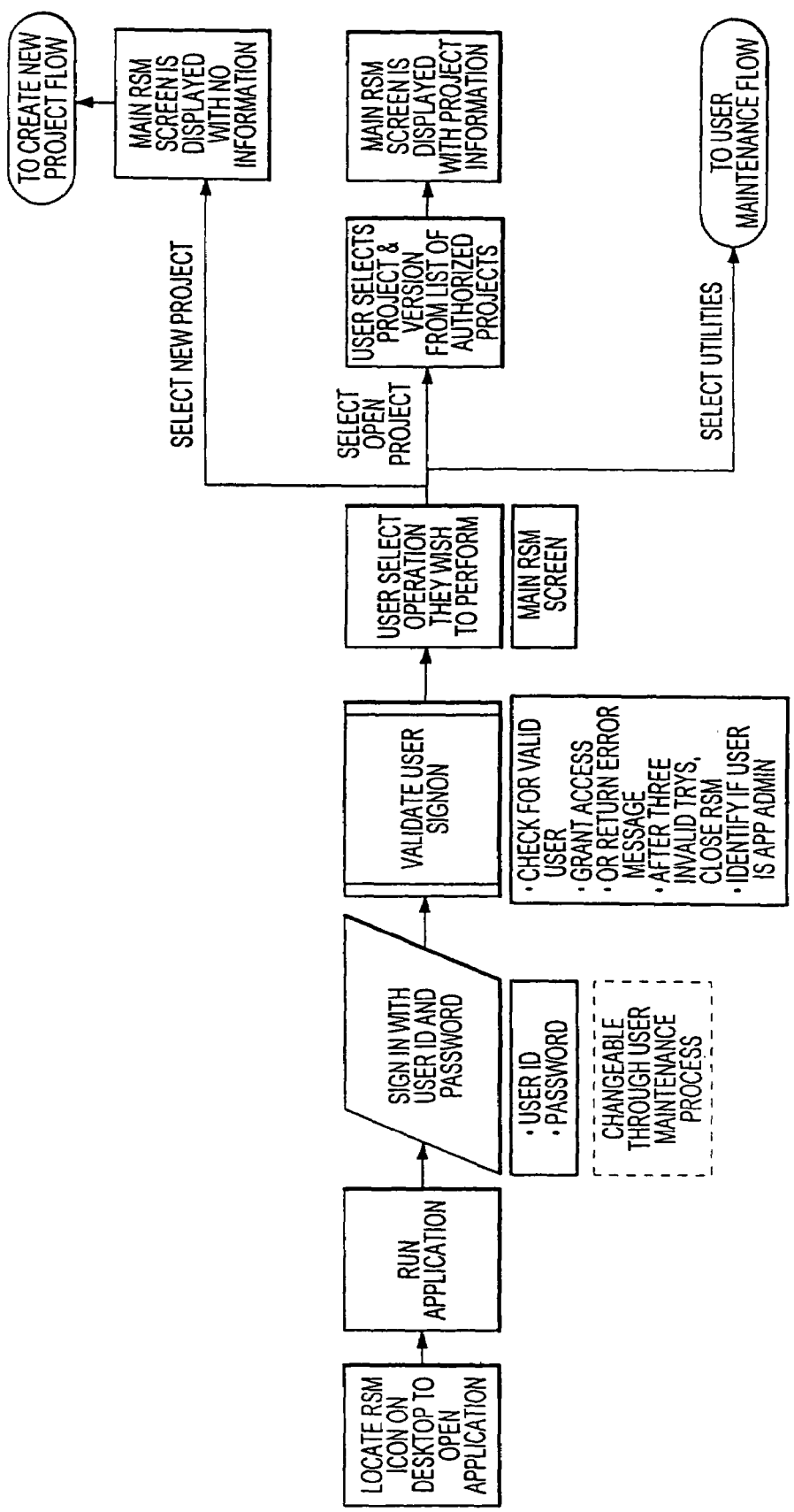
FIG. 3 is a flow diagram of a particular embodiment of the user log in process subroutine of the computer implemented project planning tool.

The invention organizes information into five modules that encompass the activities of an organization to achieve the goal of reduced product development time, cost and risk. The general sequence and function of the five modules involve, a first strategy module which assists the customer in gathering the necessary information to refine the vision of the organization. Through the use of various information organization techniques, the strategy for the product(s) are templated and organized to yield a vision and be compiled into a repository for the organization for use during the product development life cycle, and for usage by the organizations various functions in reporting and creating measures for future products. One of the key elements of this phase is the creation of the information stream in such a manner as to affect ease of communication throughout the organization for further use and memorialization as part of the repeatability afforded by the invention.

A second ideation module facilitates focus groups through a structured creative process to generate new products and services. This stage of the invention involves the use of various applications of marketing intelligence gathering, focusing of purpose, identifying customer needs, generation of new ideas, and compartmentalizing the results for analysis and transfer to the next stage of the process of the invention.

A third prioritization module guides development and prioritization of customer needs and system performance targets. This aspect of the invention operates to filter out less important activities from key activities that are essential to the successful launch and sales of the products and services. The prioritization of information provides the organization with a result that allows implementation of specific tasks and reduces time and error in development of products.

A fourth planning module provides a project planning tool which utilizes content loaded project planning templates that provide a tutorial for the project planning tool user. Selectable task content within such project planning templates may have tailorable task details such as description of the tasks, metrics for measuring the efficacy of the task, planning and scheduling criteria, data gathering for memorializaton of the repeatability on future or similar products and services, product cycle inputs and outputs, training requirements, and connections to other information storage and retrieval systems in the organization.

A fifth application module utilizes the information created and gathered up to this point to apply it to the production and support of the product. It also identifies other areas of the organization for improvement to aid in the success of the product or service, and to assist the organization through the use of various feedback mechanisms for improvement and documentation; thus providing repeatability in the product development needs of the organization. Each of the five modules may be computer implemented and configured to interact with a project planning user.

As can be easily understood, the basic concepts of the present invention may be embodied in a variety of ways. The invention involves both methods as well as apparatus to accomplish the appropriate methods. In this application, the methods are disclosed as part of the results shown to be achieved by the various apparatus described and as steps which are inherent to utilization. They are simply the natural result of utilizing the devices as intended and described. In addition, while some particular embodiments of the invention are disclosed to accomplish certain methods described, it would be understood that these can be varied in a number of ways. Importantly, as to all of the foregoing, all of these facets should be understood to be encompassed by this disclosure.

The various aspects of the planning module invention are first discussed. FIG. 1 shows a flow diagram of a particular embodiment of the high level operating concept for the planning module. Various planning steps within the planning module invention have been computerized. The computer implemented planning steps are identified by FIG. 1 as blocks below the planning step. While these computer implemented planning steps have been given specific identifiers for convenience, these identifiers are not intended to limit the scope of the invention or the functions which they perform. These computer implemented planning steps makeup the main project planning application software. The main project planning application software in conjunction with computer hardware makes up a computerized project planning tool. The main project planning application comprises software which may be written in various programming languages which would be known to those with ordinary skill in the art. An example of the software application language could be MS Visual Basic® integrated with a database like MS SQL Server® both of which are served from a MS Windows NT®. The software program may be run on various hardware platforms such as an Intel® or Alpha® processor based system. Computer hardware as would also be known to those with ordinary skill in the art. The main project planning application may be configured to interact with a project planning tool user by maintaining a hierarchical project planning architecture which organizes content loaded project planning templates. The application of the computerized project planning tool provides a computer implemented method of project planning. The planning tool and planning method are discussed in detail below with reference to additional figures.

Referring first to FIG. 1, once a project has been identified and a program manager or project planning tool user has been determined the program manager may be given permissions to enter a the main project planning application (or RSM system) of the computerized project planning tool. The first subroutine of the project planning tool security setup and maintenance (shown by FIG. 1 as subroutine 2.1.4) and the second subroutine user log in process (shown by FIG. 1 as subroutine 2.1.1) allows the project planning tool user to gain access to the proprietary content of the main project planning application.

The Security Setup and Maintenance subroutine generates an interactive security setup and maintenance screen. The project planning tool user inputs various user identification details into fields within the interactive screen such as last name, first name, department, e-mail address, password, or application administration flag. A user validation function analyzes the user identification details input to the fields within the interactive screen. Upon validating the user identification details the project planning tool may be given access to the main project planning application. A user identification details lock-unlock function may be incorporated into the subroutine to prevent the project planning tool user from changing user identification details. The security and maintenance routine may also comprise a user information editor which provides the project planning tool user with functions to change user identification details or delete user identification details. The delete user identification details function may also automatically check other projects and provide an option to delete the project planning tool user from all existing projects.

The User Log In Process subroutine generates an interactive user log in screen which provides a run program prompt and allows the project planning tool user to input identification details to fields within the user log in screen. The User Log In Process subroutine then validates user identification details input by the project planning tool user, or may provide an error message to the project planning user that the identification details were not validated, or may close the user log in program after a certain number of invalid attempts by the project planning tool user to input user identification details. Once the User Log In Program validates the identification details input by the project planning tool user, the user log in program grants the user access to the real time proprietary content of the project planning tool.

Figure 4:
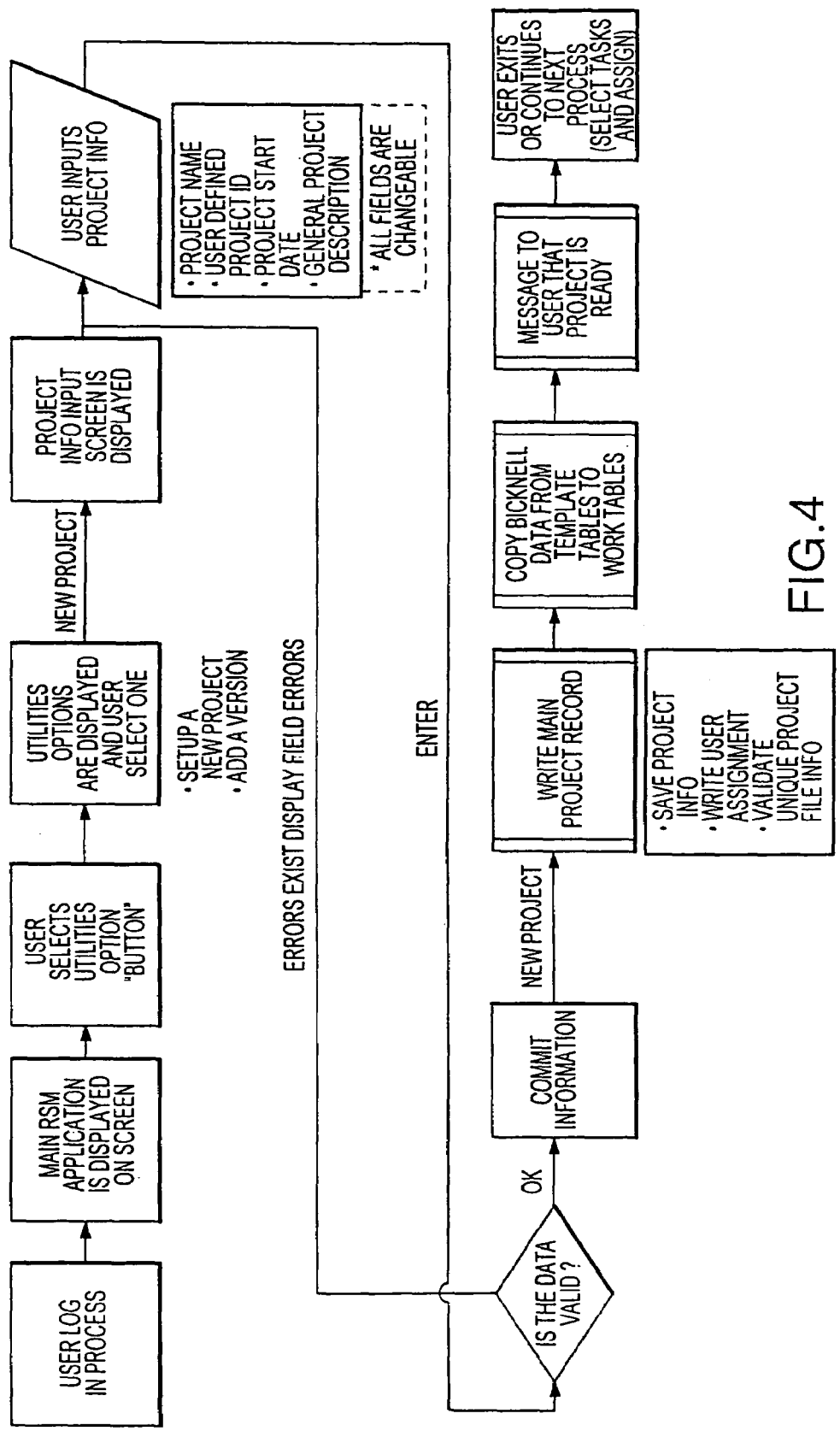
FIG. 4 is a flow diagram of a particular embodiment of the create a new project subroutine of the computer implemented project planning tool.

As shown by FIG. 4, once the project planning tool user successfully completes the user log in process, the project planning tool user may use the Create A New Project subroutine (shown by FIG. 1 as block 2.1.2). The Create A New Project subroutine generates a utilities option selection indicator. The project planning tool user may then choose to create a new project plan or open an existing project plan. If the user selects to create a new project plan, an interactive project information screen is generated having fields to input project information. The user inputs project information within the fields provided. Project planning information such as project name, user defined project identification details, project start date, general project description, or group security may be input. Naturally, other fields could be defined as necessary to define the planning project. The Create A New Project subroutine may then display field errors, approve the project information, commit the project information, or write a new project record. Writing the new project record may comprise saving the project information, or writing user assignment or validating unique project file information.

Figure 5:
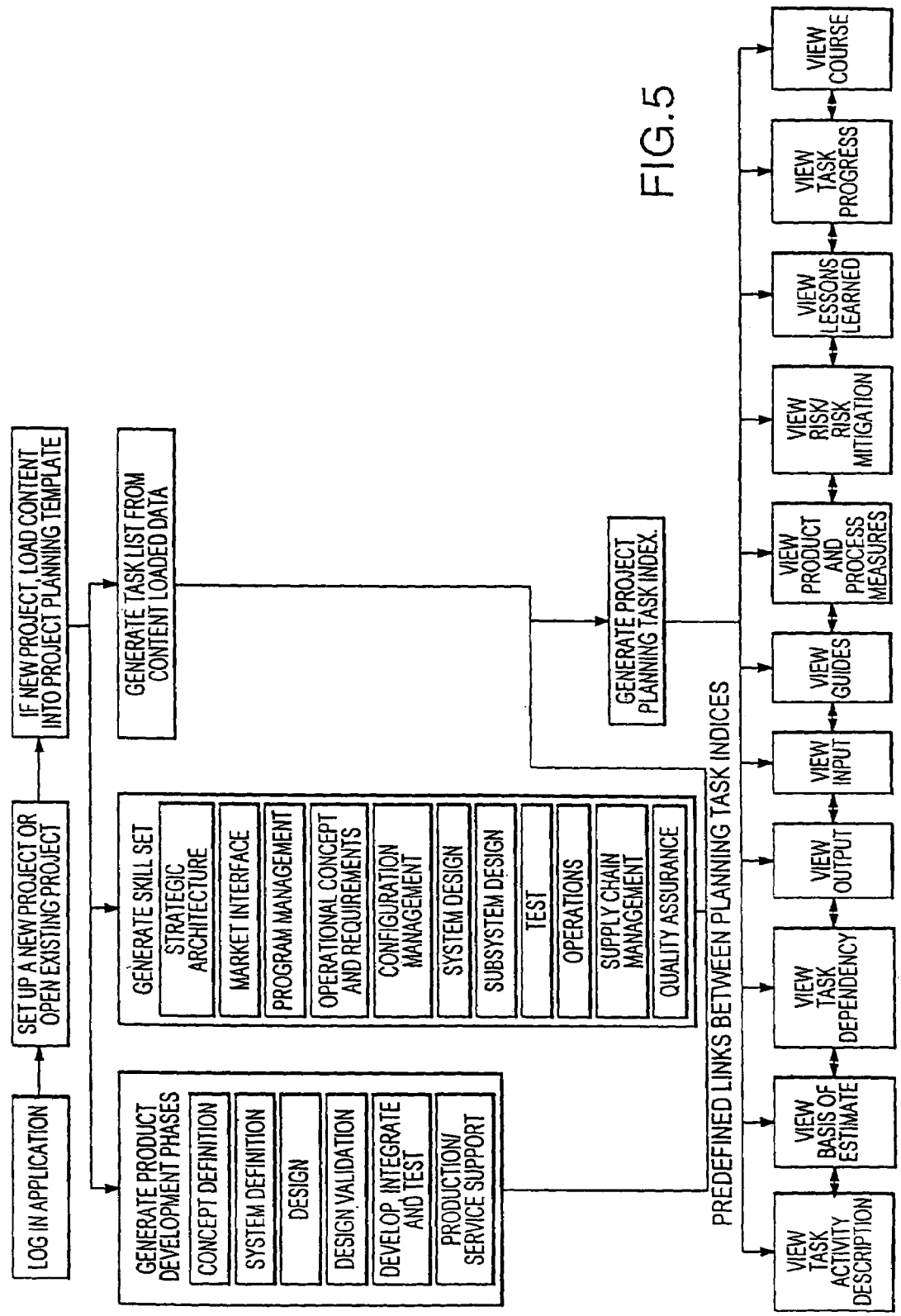
FIG. 5 is a flow diagram of a particular embodiment of the hierarchical project planning architecture.

Referring again to FIG. 4, after writing the main project record the main project planning application loads proprietary data from template tables to work tables. The proprietary data loaded from the template tables generates content within project planning templates organized into a hierarchical planning architecture as shown by FIG. 5. The content loaded project planning templates which are generated by the main project planning application are configured to interact with a project planning tool user.

Figure 6:
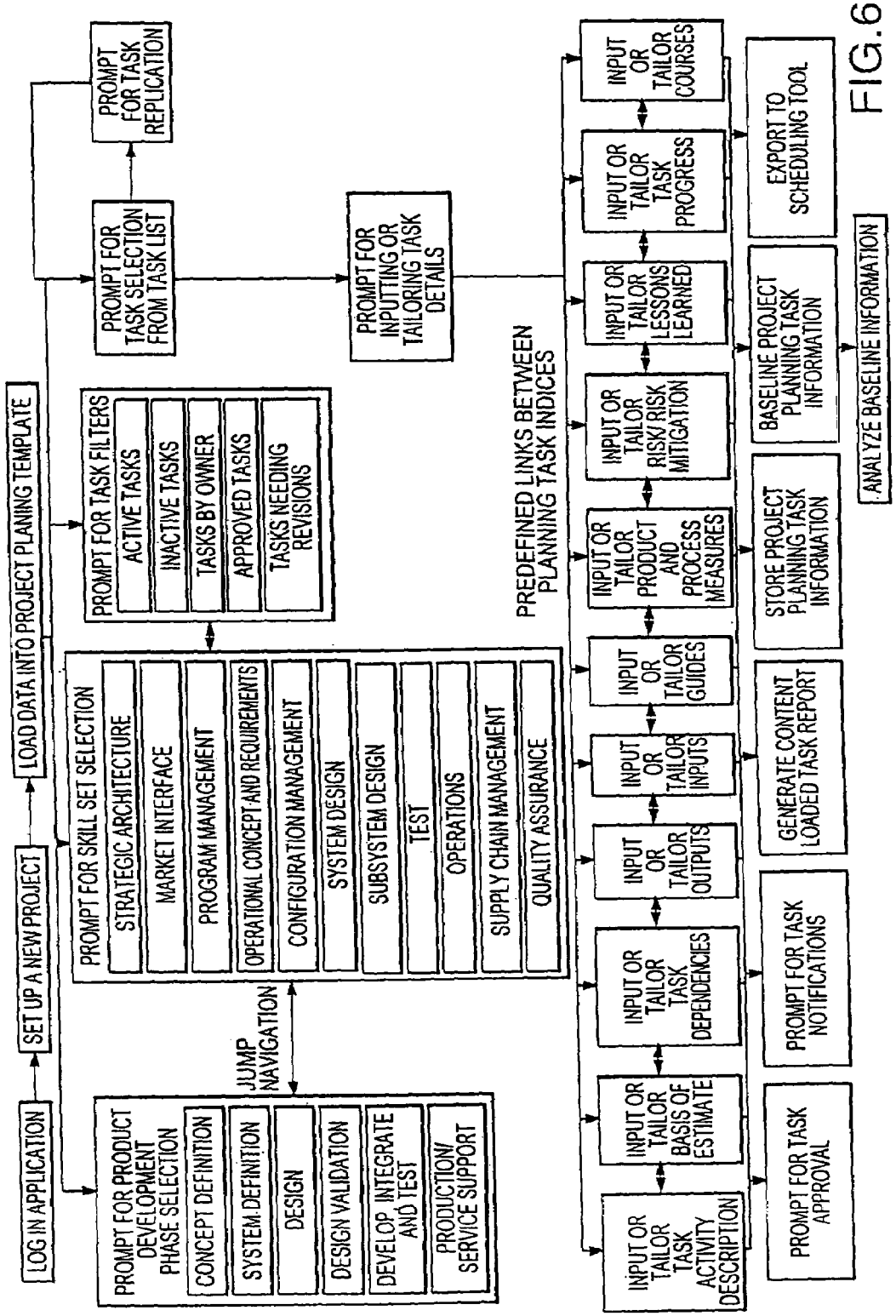
FIG. 6 is a flow diagram showing how the project planning tool navigates the project planning tool user through a particular embodiment of the hierarchical project planning architecture.

As shown by FIGS. 5 and 6, the heirarchical planning architecture generated by the main project planning application comprises selectable lists of product development phases, skill sets, or tasks. A product development phase predefines milestones within the life cycle of developing a product or developing a service. A product development phase may be selected from the group consisting of concept definition; system definition; design; design validation; develop, integrate, and test; product/service support.

Concept Definition encompasses the early activities of a product development effort. It includes the initial scoping of the specific activities for prioritization of the customer needs and resulting requirements that will lead to design specifications. This phase contains the initial activity that will determine the first feasibility of the concept or of competing or alternative concepts.

System Definition focuses on bringing additional detail to the design and support elements of product development. Integration of the various product, service and business operations is emphasized as well as defining subsystems and components to be evaluated in smaller packages integrated into the entire product development effort.

Design Phase is in many ways a continuation of the activities in the Systems Definition, but further decomposition of the subsystem and activities occurs including development of prototypes and models. Testing details are established and operational scenarios for support of the product are further defined with the goal being the creation of the complete specification and determination of the targets for the specification. The end of this phase is determined by the ability of the design to stated specification requirements prior to acceptance testing.

Design Validation encompasses the activities that allow the assurance that the design will satisfy not only the physical and functional requirements for the product and service, but also that the sales, support service, maintenance and producibility of the product is confirmed. Any last changes in the detailed design is accomplished in this phase, but should only be mirror and not impact the basic functionality or performance characteristics.

Develop, Integrate and Test Phase of the product development process encompasses actual acceptance testing of the product, confirms robustness of the design, validates the support and service elements, and readies the product for production, distribution and service.

Production and Service Support Phase transitions the product from the final accepted configuration and operational scenario to operational development and support in the field (customer environment and sales environment). The service elements have been put in place and this phase focus on sales and customer support, demand, distribution and retirement of the product or phase out activities when a new replacement is rolled out.

A skill set predefines areas of expertise. A skill set may be selected from the group consisting of strategic architecture; market interface; program management; operational definition and requirements; configuration management; system design; subsystem design; test; operations; supply chain management; or quality assurance.

Strategic architecture defines a group of activities requiring similar skills necessary to establish and manage the vision, mission, values, strategies, goals, and measures of performance at the company or corporate level.

Market Interface defines a group of activities requiring similar skills necessary to define, analyze and develop market opportunities.

Program Management a group of activities requiring similar skills necessary to translate business opportunities to an integrated program management plan and lead a multi discipline team through the execution of that plan.

Operational Concept and Requirements defines a group of activities requiring similar skills necessary to develop, analyze and document operational concepts and system and subsystem requirements that translate the market needs.

Configuration Management defines a group of activities requiring similar skills necessary to develop, implement and manage configuration management.

System Design defines a group of activities requiring similar skills necessary to define, analyze, validate and maintain an overall system architecture and interfaces.

Subsystem Design defines a group of activities requiring similar skills necessary to define, analyze, validate and maintain subsystem architectures and interfaces.

Test defines a group of activities requiring similar skills necessary to define, analyze and test an overall system, including subsystems and operations.

Operations defines a group of activities requiring similar skills necessary to define, analyze, develop and deploy operations for production, service, installation, training, maintenance and retirement.

Supply Chain Management defines a group of activities requiring similar skills necessary for subcontract and acquisition management.

Quality Assurance a group of activities requiring similar skills necessary to establish and manage all aspects of product quality.

Tasks having prefined activities are sorted by the main project planning application based upon project planning tool user selection various combinations of phases and skill sets and compiled into task lists from which the project planning tool user may select tasks.

While definitions for phases and skill sets have been described above and are believed to cut across various industries, phases or skill sets could be defined by different categories, encompass different content, or vary in number. These differences however would not significantly change the basic concept, function, or applications with respect to the hierarchical project planning architecture.

Figure 7:
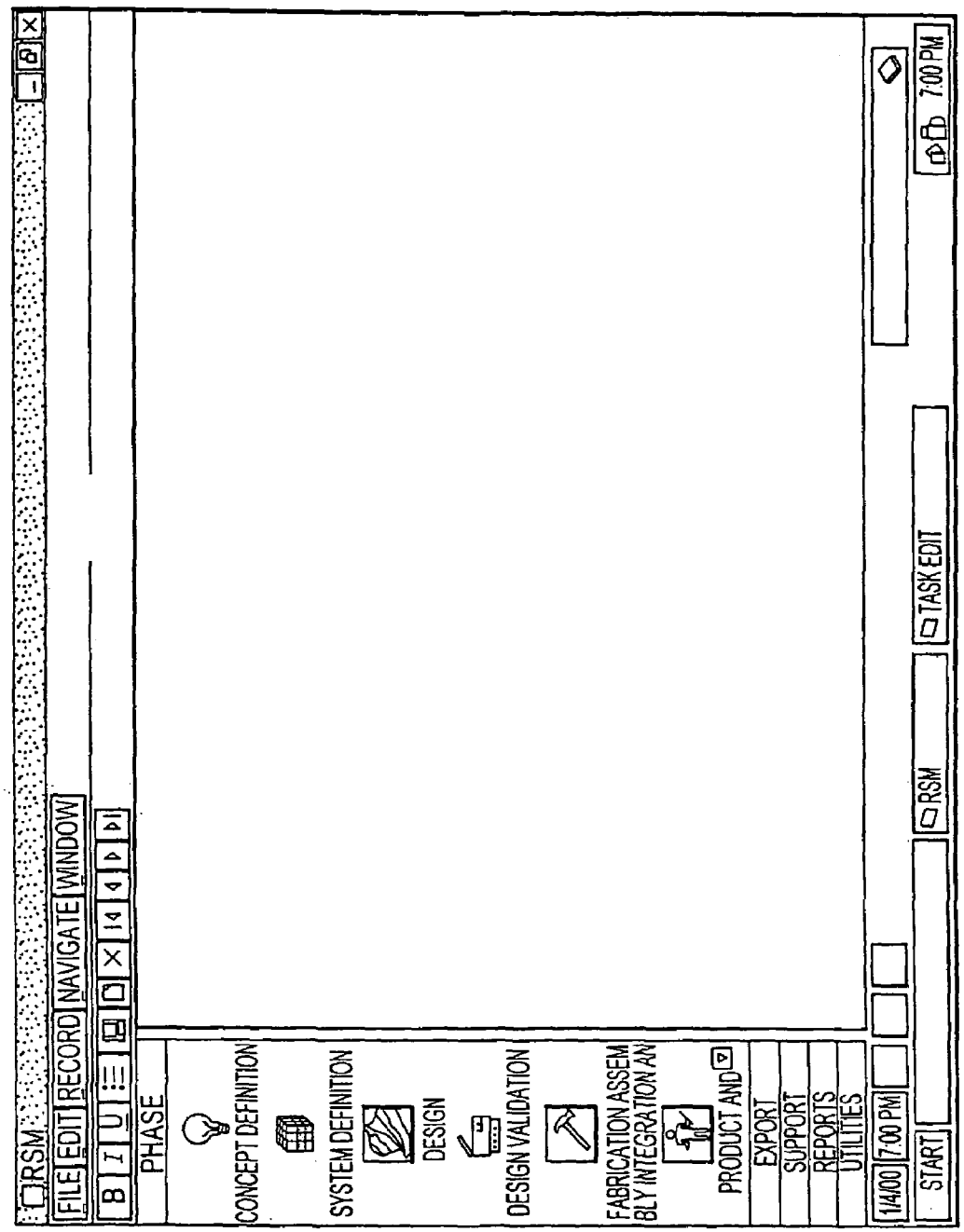
FIG. 7 is a particular embodiment of a content loaded project planning template showing project planning prompts to phases.
Figure 8:
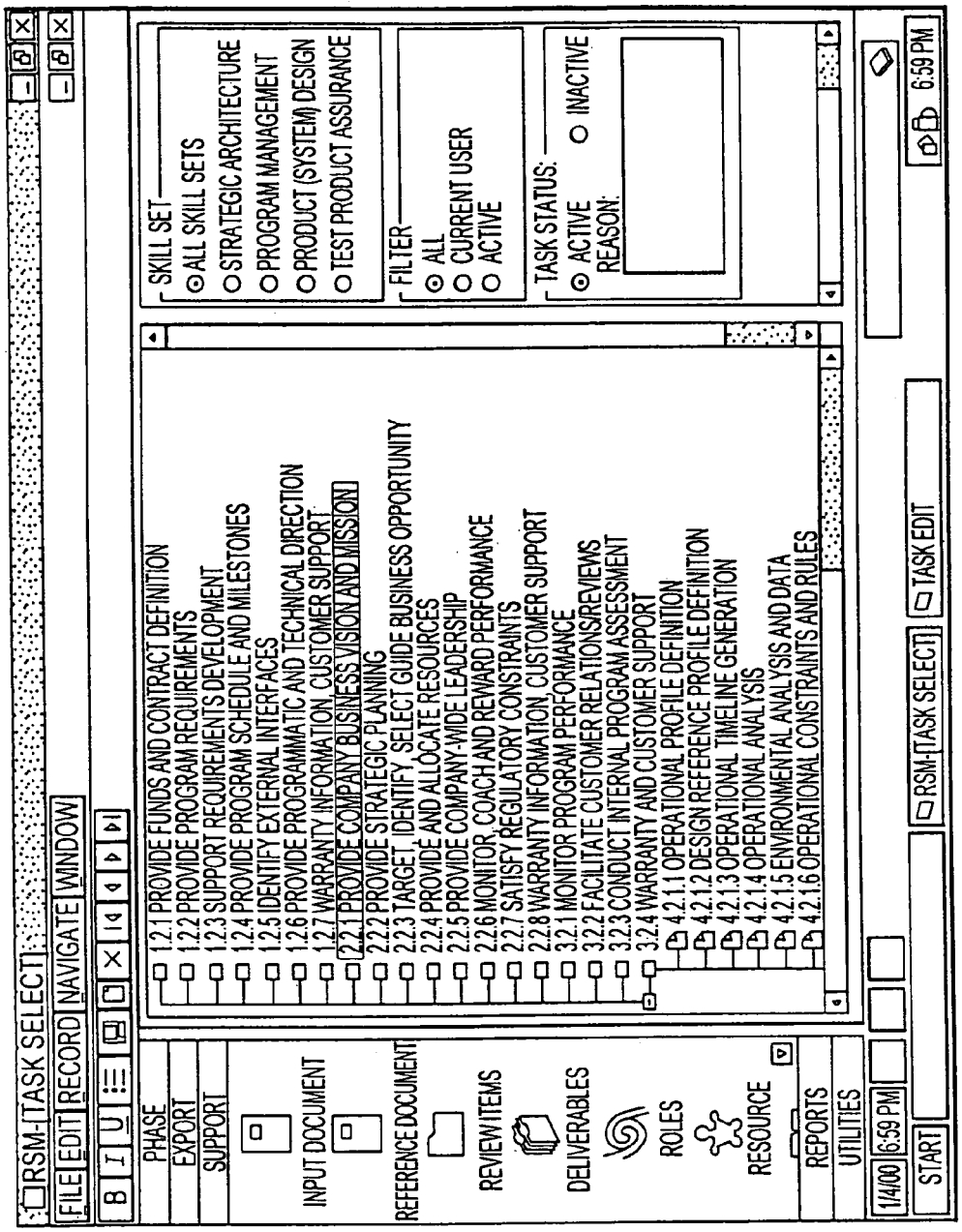
FIG. 8 is a particular embodiment of a content loaded project planning template showing project planning prompts to skill sets.
Figure 9:
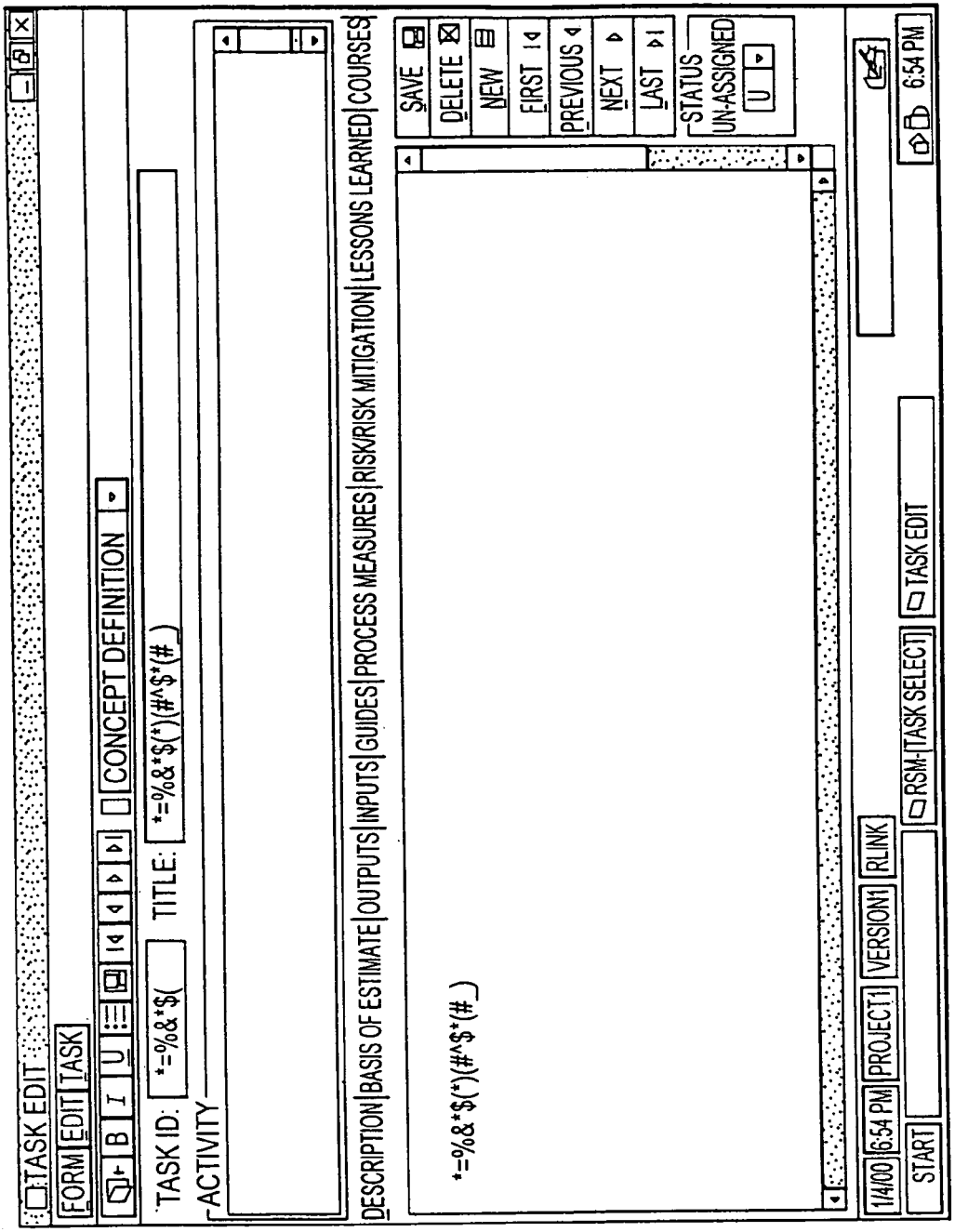
FIG. 9 is a particular embodiment of a content loaded project planning template showing a selectable task content index.
Figure 10:
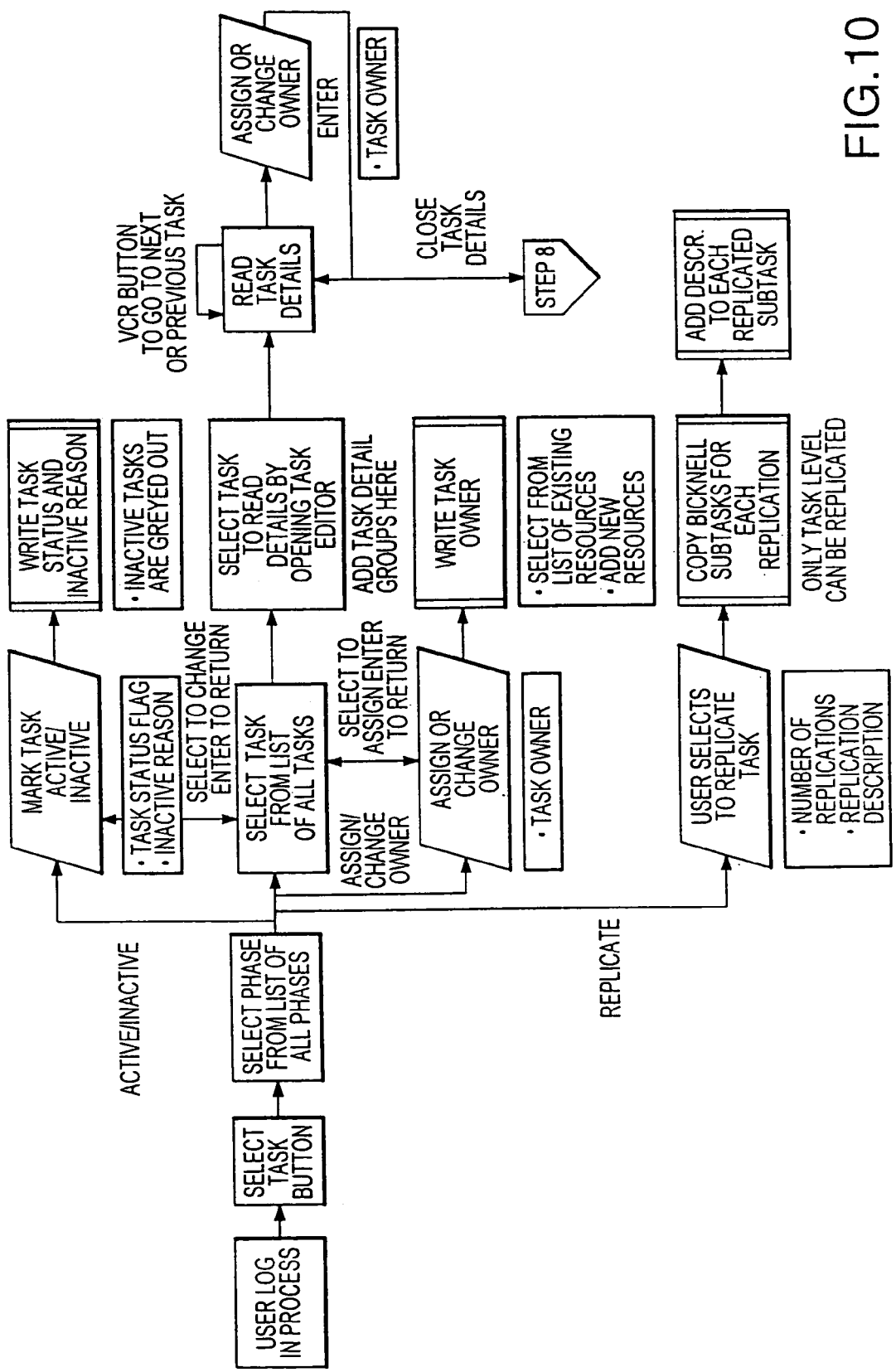
FIG. 10 is a flow diagram showing a particular embodiment of the select and assign tasks subroutine of the computer implemented project planning tool.

As shown by FIGS. 6 and 10, a Select and Assign Tasks subroutine (shown by figure one as block 2.1.3) navigates at least one project planning user with project planning prompts through the hierarchical project planning architecture. Project planning prompts may be visual project planning prompts, such as icons shown by FIG. 7, or selectable bullets as shown by FIG. 8, or selectable lists as shown in FIG. 8. The project planning prompts could be auditory or could be visual or could be a combination of both. The project planning tool user may first select a phase or select a skill set. Selection of a phase or a skill set automatically navigates the project planning user to a task list. The project planning tool user may then select a task from the task list. Upon selection of a task, the main project planning application then generates at least one content loaded project planning template having task content sorted by phase and skill set parameters. The task content generated within the content loaded project planning template provides a tutorial for the project planning tool user with respect to the task selected. Task content may be generated within a selectable task content index. The project planning tool user may select from the selectable task content index which may then generate task content such as a task activity description, a basis of estimate, task dependency, outputs, inputs, guides, product measures and process measures, risk/risk mitigation, lessons learned, task progress, or courses. The task content generated may be visual or auditory or a combination of both. While these specific examples of selectable task content are believed to cut across multiple industries, selectable task content could be defined differently with greater or fewer categories, more or lest content, or by different task indices without significantly changing the nature of the hierarchical project planning architecture or it application. The task content may be held within the main project planning application or as hyperlinks to external databases or may be provided as references to either electronic databases or non-electronic hard copy documents, videotape, recordings or otherwise. After the task content is reviewed by the project planning tool user the task may be marked active or inactive. A particular embodiment of a content loaded project planning template with a selectable content index is shown by FIG. 9.

Unlike project scheduling which will be discussed in further detail below, project planning defines the activity and resources necessary to develop a product or service. A scheduling tool or spread sheet merely calenders the activities and resources defined by the project planner. The main project planning application of the instant invention generates predefined task activity and predefined resources which are sorted by the hierarchical project planning architecture. In effect, the instant project planning tool with above describe content loaded project planning templates interact with the project planning tool user to generate a project plan. This project plan may then be scheduled.

Figure 11:
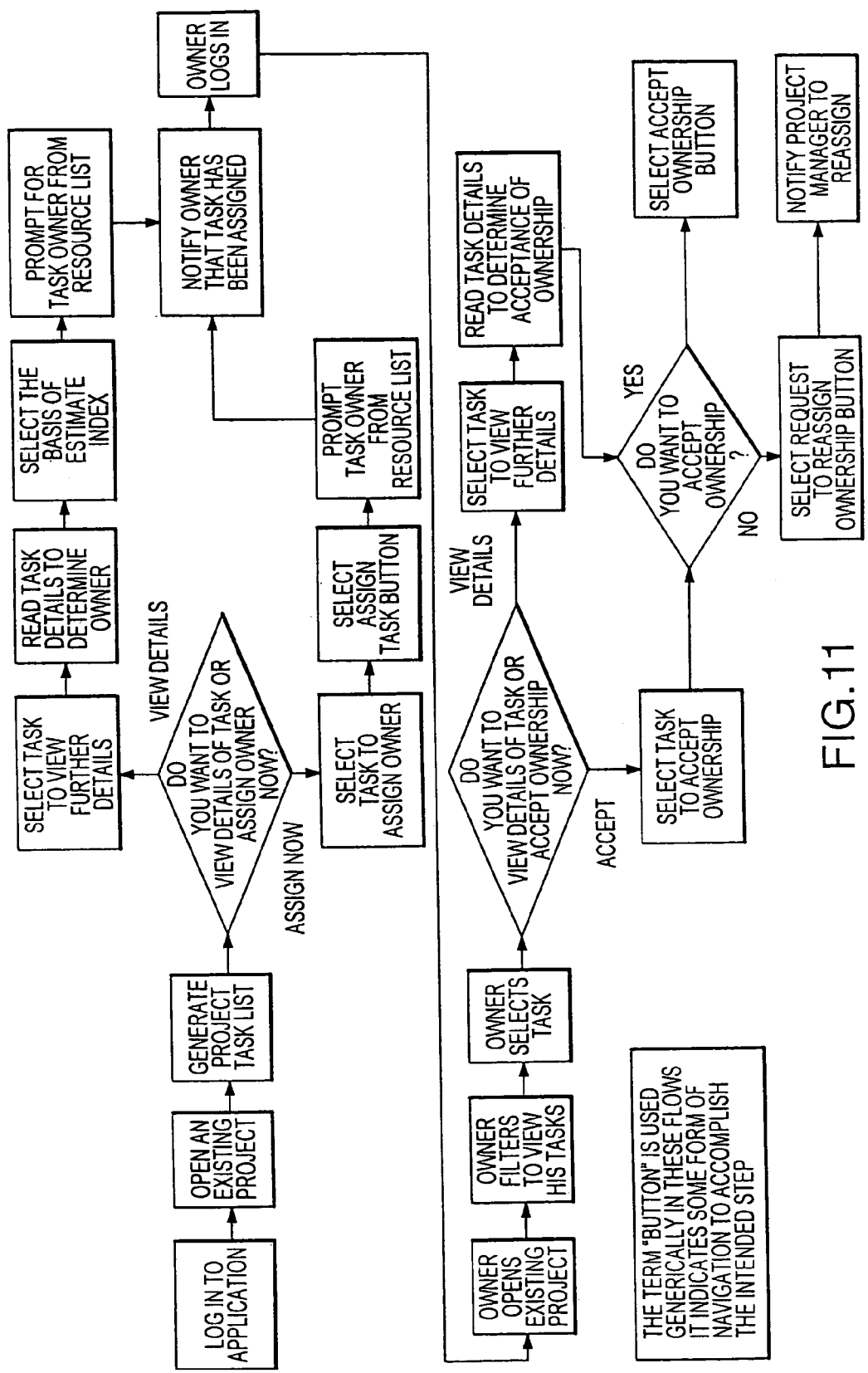
FIG. 11 is a flow diagram showing a particular embodiment of how the project planning tool navigates the project planning tool user through a particular embodiment of the select and assign tasks subroutine.

Again referring to FIG. 10 and to FIG. 11 (shown in FIG. 1 by block 2.1.3) the Select and Assign Tasks subroutine allows the project planning tool user to assign a task to a task owner. A task owner may be the project planning tool user assigning the task or may be at least one other project planning tool user. Referring to FIG. 11, the project planning tool user first selects a task from the task list. Secondly, a resource list is generated upon selecting an assign task button. A task owner may then be selected from the resource list. Upon selection of a task owner the Select and Assign Task subroutine assigns the task automatically to the task owner. Alternately, the project planning tool user may first review task content within the content loaded project planning template, then select basis of estimate from the selectable task content index. The project planning tool user then selects the assign task button (or other prompt) and selects a task owner from the resources list generated. Upon selection of a task owner the Select and Assign Task subroutine assigns the task automatically to the task owner. The assignment of the task allows the task owner to sort tasks within the main project planning application by task owner identification description. The task owner may then select a task and the main project planning application generates the content loaded project planning template for review by the task owner. The task owner may then be prompted to accept ownership of the task or may select request to reassign task ownership.

Figure 15:
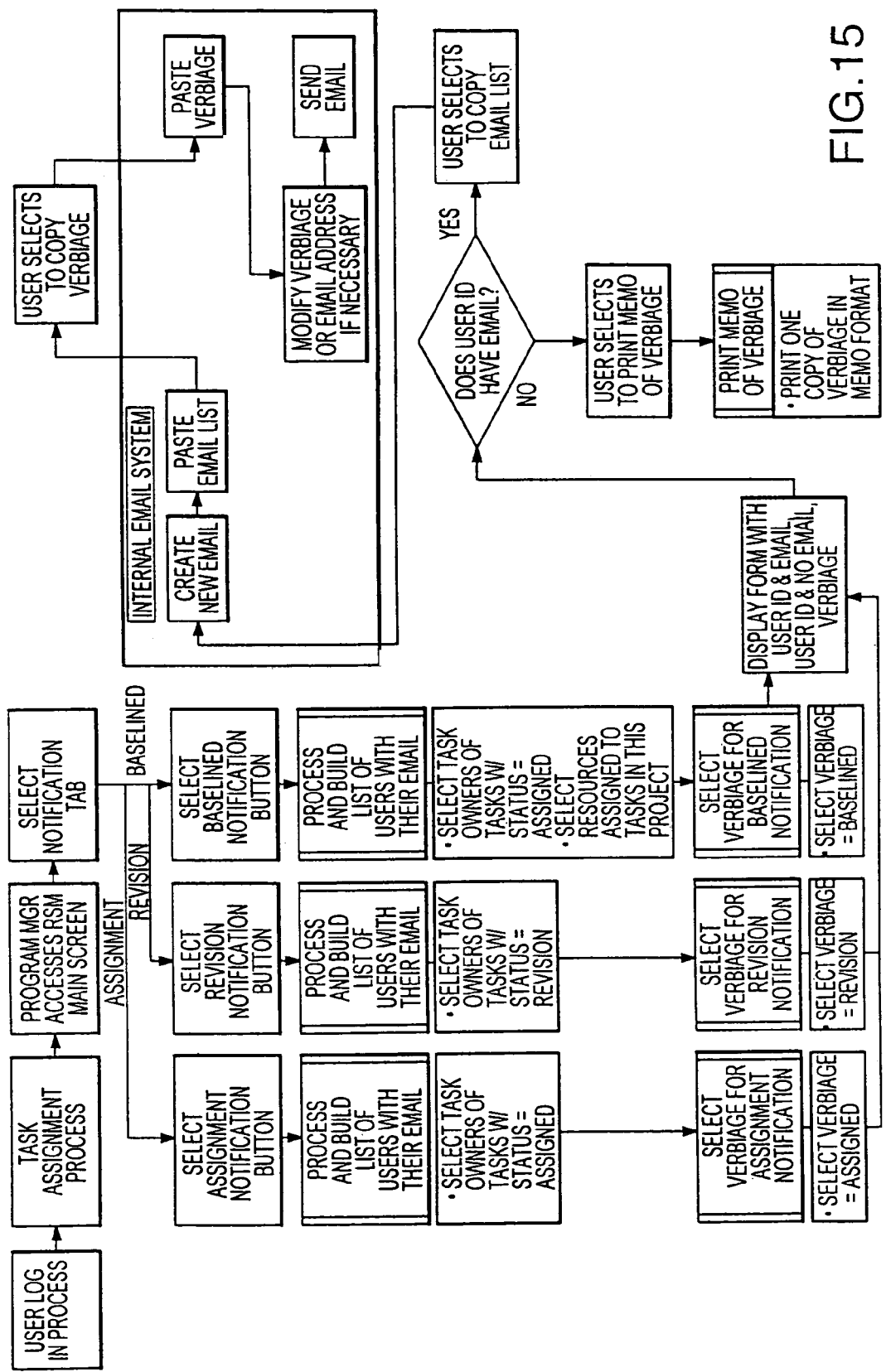
FIG. 15 is a flow diagram showing a particular embodiment of the notification process subroutine of the computer implemented project planning tool.

As shown by FIG. 15 the main project planning application further comprises a Notification Process subroutine (shown by FIG. 1 as subroutine 2.1.5). The project planning tool user may notify the task owner of assignment of the task. Notification of the task owner may be accomplished by selecting a notification tab generated by the main project planning application which navigates the project planning tool user to a notification button. Selection of the notification button automatically generates a list of task owners having e-mail addresses or to which e-mail addresses may be added. Verbiage for notification of may also be automatically generated. The e-mail addresses along with the notification verbiage may be copied automatically or manually to an internal or external e-mail system or alternately printed as a hard copy depending on the action selected by the project planning tool user. The notification verbiage may then be sent by e-mail or by hard copy to the task owner.

Figure 12:
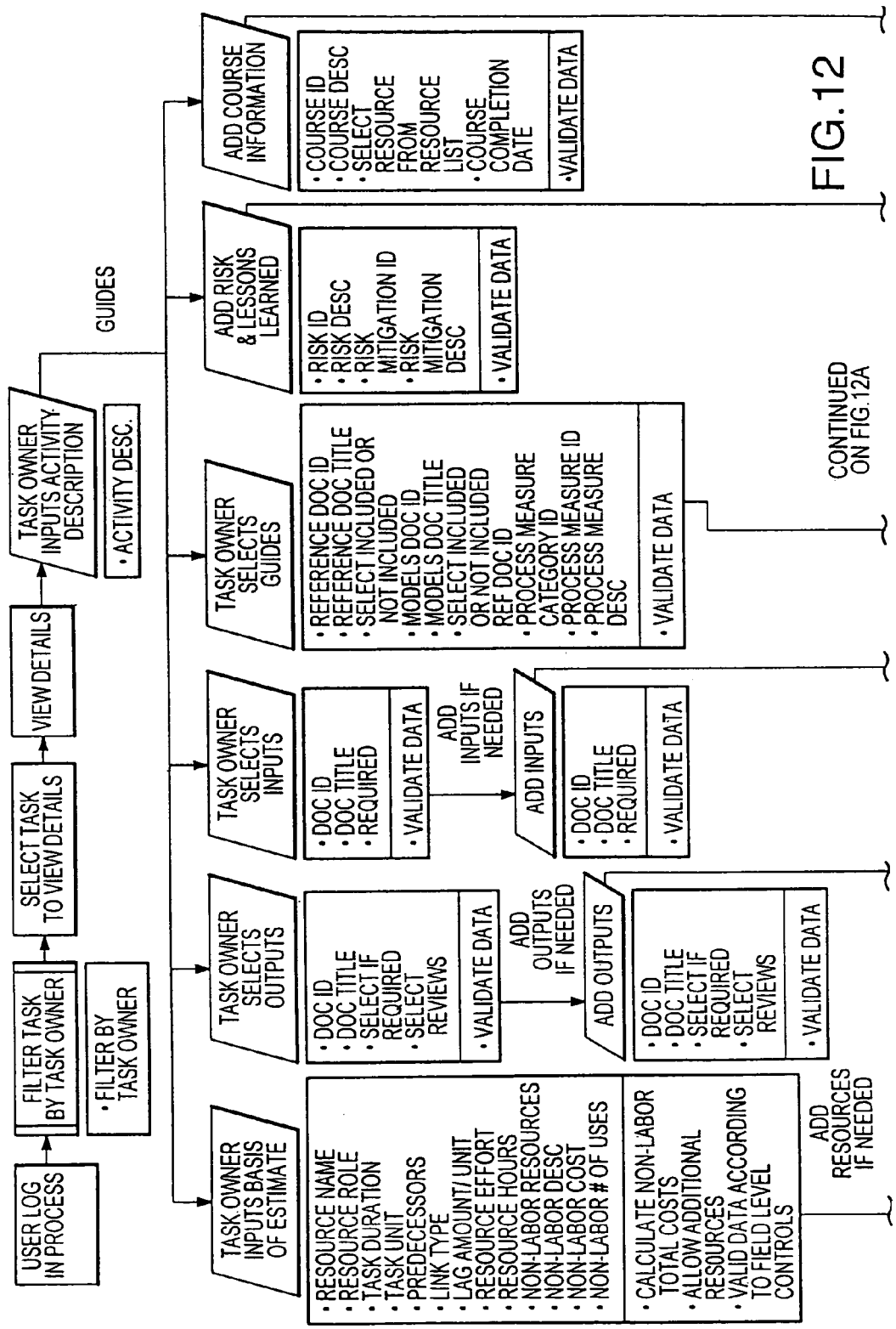
FIG. 12 is a flow diagram showing a particular embodiment of the complete task details subroutine of the computer implemented project planning tool.
Figure 12A:
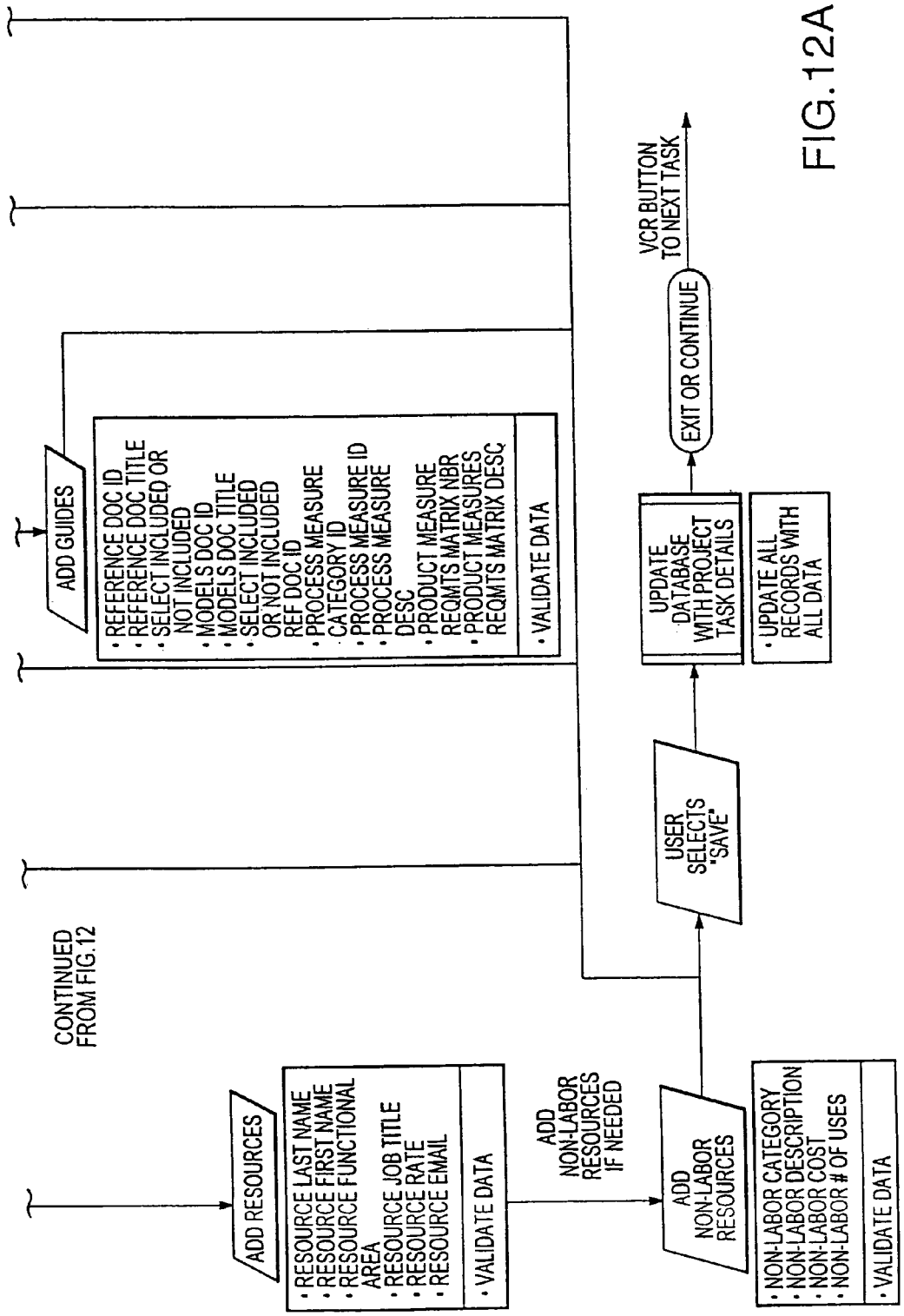
Figure 13:
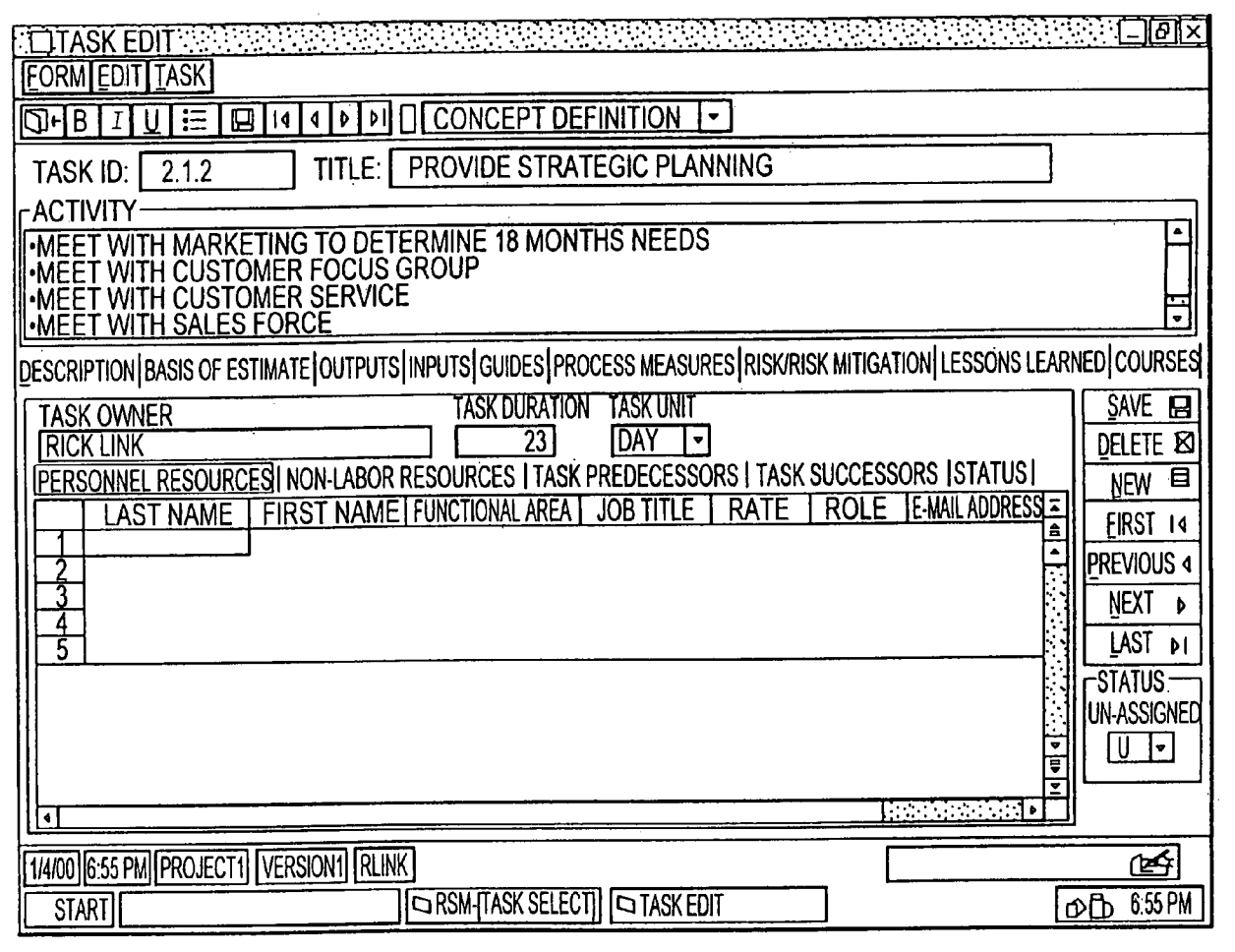

Referring to FIG. 12, the main project planning application may further comprise a Complete Task Details subroutine (shown by FIG. 1 as subroutine 2.1.6). The task owner may tailor content within the content loaded project planning templates including the selectable content generated by the selectable content index with the Complete Task Details subroutine. The project planning tool user may in one particular embodiment of the invention, as shown by FIG. 13, tailor activity descriptions in the content loaded project planning templates within a rich text formatting window generator.

Figure 14:
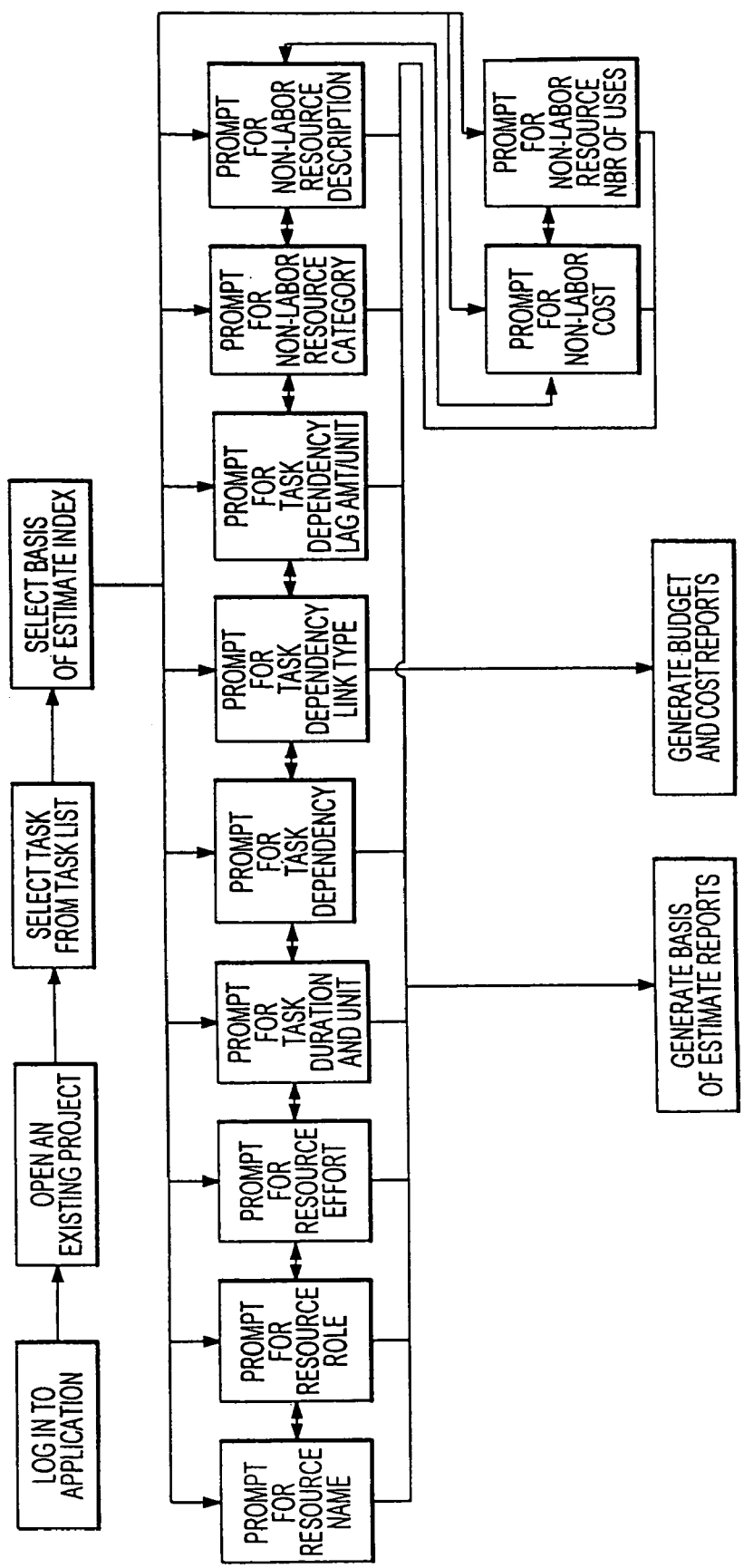
FIG. 14 is a flow diagram showing a particular embodiment of how the project planning tool navigates the project planning tool user through basis of estimate and estimating resources.

As further shown, in FIG. 12, tailoring of selectable task content may also include inputting task details to a basis of estimate. Referring also to FIG. 14, selecting the basis of estimate prompt in the selectable content index generates a basis of estimate with fields in which to input task details. The project planning tool user may then be prompted to input estimated resources into fields. Inputting estimated resources into the into the various fields within the basis of estimate may comprise entering information identifying the task owner, task duration, or task duration units. The basis of estimate may also include a selectable resources index. The project planning tool user may select a resources which may comprise personnel resources or non-labor resources. Tailoring the task content for these resources may comprise inputting personnel resources identifiers such as last name, first name, the functional area, job title, rate, role, e-mail address and the like with respect to personnel resources. With respect to non-labor resources tailoring the task details may include inputting non-labor description, non-labor cost, number of non-labor uses, and the like. Importantly, the resources for a task are estimated entirely within the context of a content loaded project planning template which pre-defines the scope of the task and predefines the available resources, rather than defining these attributes as separate steps outside the computer implemented project plan. Moreover, the content loaded project planning template serves as a tutorial to further guide the project planning tool user while estimating resources.

Tailoring of selectable content may also include selecting outputs or adding outputs to the selectable task content. Outputs are definable tangible or intangible items generated by performing the task described by the content loaded project planning template. An output may be a specific document as but one example. Selectable outputs may be generated by the main project planning application as a output list from the project planning tool user may select. The project planning tool user may also add outputs manually to the output list.

Tailoring of selectable content may also include selecting inputs or adding inputs to the selectable task content. Inputs are definable tangible or intangible items required to perform the task described by the content loaded project planning template. An input may be a specific document as but one example. Selectable inputs may be generated by the main project planning application as a input list from which the project planning tool user may select. The project planning tool user may also add inputs manually to the input list.

Tailoring of selectable content may also include selecting guides or adding guides to the selectable task content. A guide may be any definable standard which may be helpful to perform the task described by the content loaded project planning template. A guide may be a reference document, a model, or hyperlinked electronic information for example. Selectable guides may be generated by the main project planning application as a guide list from which the project planning tool user may select. The project planning tool user may also add guides manually to the guide list.

Tailoring of selectable content may also include selecting risks or selecting risk mitigation or adding risks or risk mitigation to the selectable task content. A risk may be any definable adverse outcome which may be helpful to avoid during the performance of the task described by the content loaded project planning template. Risk mitigation may be any definable action which mitigates the adverse outcome. Selectable risks or selectable risk mitigation may be generated by the main project planning application as a risk list or risk mitigation list from which the project planning tool user may select. The project planning tool user may also add risks or risk mitigation manually to the risk list or risk mitigation list.

Tailoring of selectable content may also include selecting lessons learned or adding lessons learned to the selectable task content. A lesson learned may be any useful piece of practical wisdom acquired by experience or study which may be helpful to perform the task described by the content loaded project planning template. A lesson learned may be a time saving method modification for example. Selectable lessons earned may be generated by the main project planning application as a lessons learned list from which the project planning tool user may select. The project planning tool user may also add lessons learned manually to the lessons learned list.

Tailoring of selectable content may also include selecting courses or adding courses to the selectable task content. A course may be any definable training which may be necessary or helpful to perform the task described by the content loaded project planning template. A course may be in-house or out-of-house training session, academic study, video tape instruction, or other tutorial as examples. Selectable courses or course information may be generated by the main project planning application as a course list from which the project planning tool user may select. The project planning tool user may also add courses or course descriptions manually to the course list.

Tailoring of selectable content may also include selecting product or process measures or adding product or process measures to the selectable task content of the content loaded project planning template. A product or process measure may be any definable measure which may be helpful to assess compliance to the task described by the content loaded project planning template. A product or process measure may be statutory standards, government standards or regulations, in-house quality assurance standards, or the like. Selectable product or process measures may be generated by the main project planning application as a product or process measure list from which the project planning tool user may select. The project planning tool user may also add product or process measures manually to the product or process list.

With respect to any of the task content or selectable task content tailored as described above, the main project planning application may save the changes made by the project planning tool user to the selectable task content of the content loaded project planning template. The main project planning application may also update the computerized project planning tool with the tailored task details.

Figure 16:
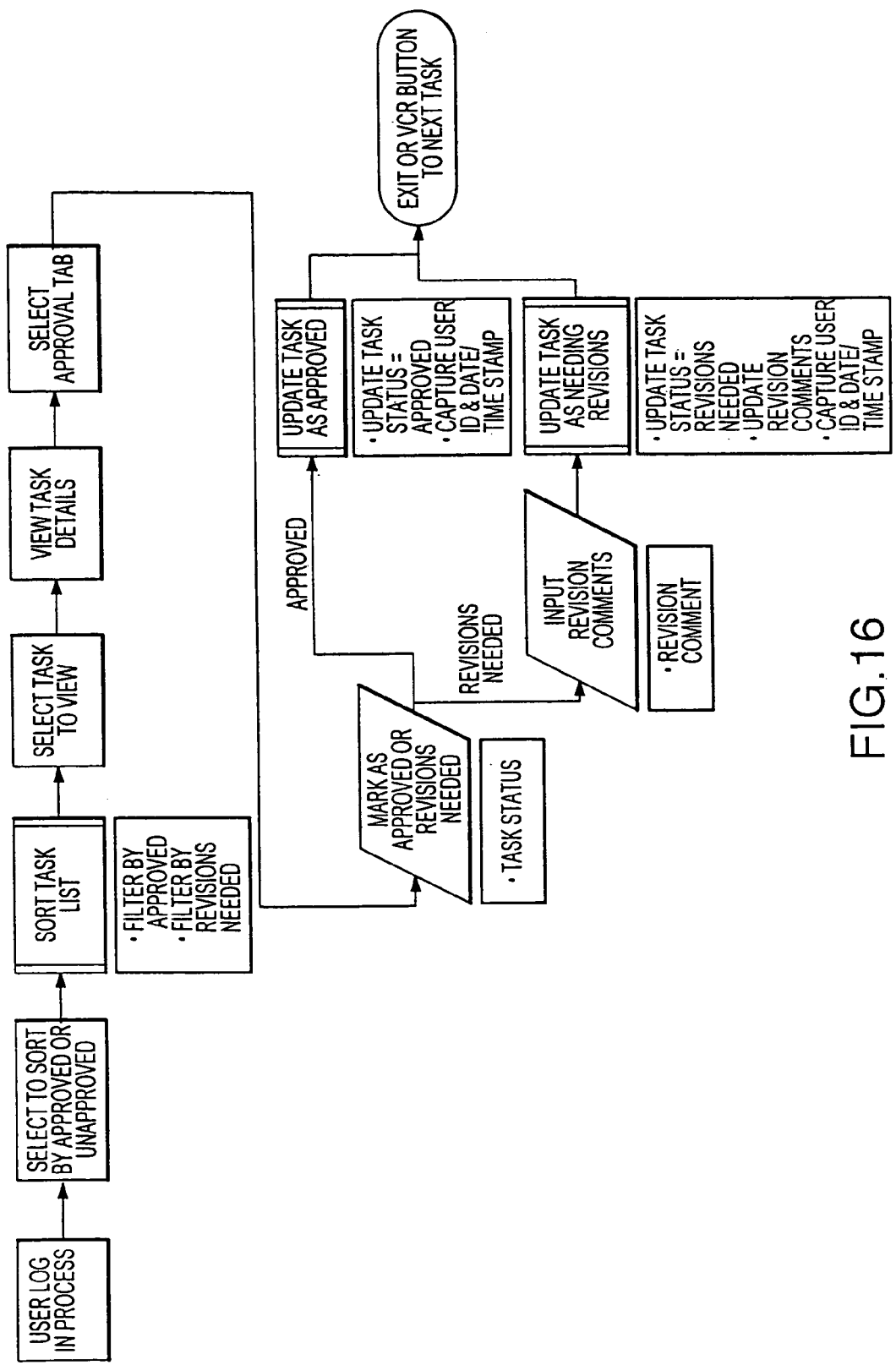
FIG. 16 is a flow diagram showing a particular embodiment of the manage completion of task details subroutine of the computer implemented project planning tool.

Referring to FIG. 16, main project planning application provides a Manage Task Completion (shown by FIG. 1 as subroutine 2.1.7) for completion and approval of the tailored content within the content loaded project planning template. This aspect of the project planning tool allows other project planning tool users to review the task content after it has been tailored. The project planning tool user reviewing the tailored task content may mark the tailored content as approved, or may input revision comments. The Manage Task Completion subroutine then updates the task content as approved or as needing revisions.

Figure 17:
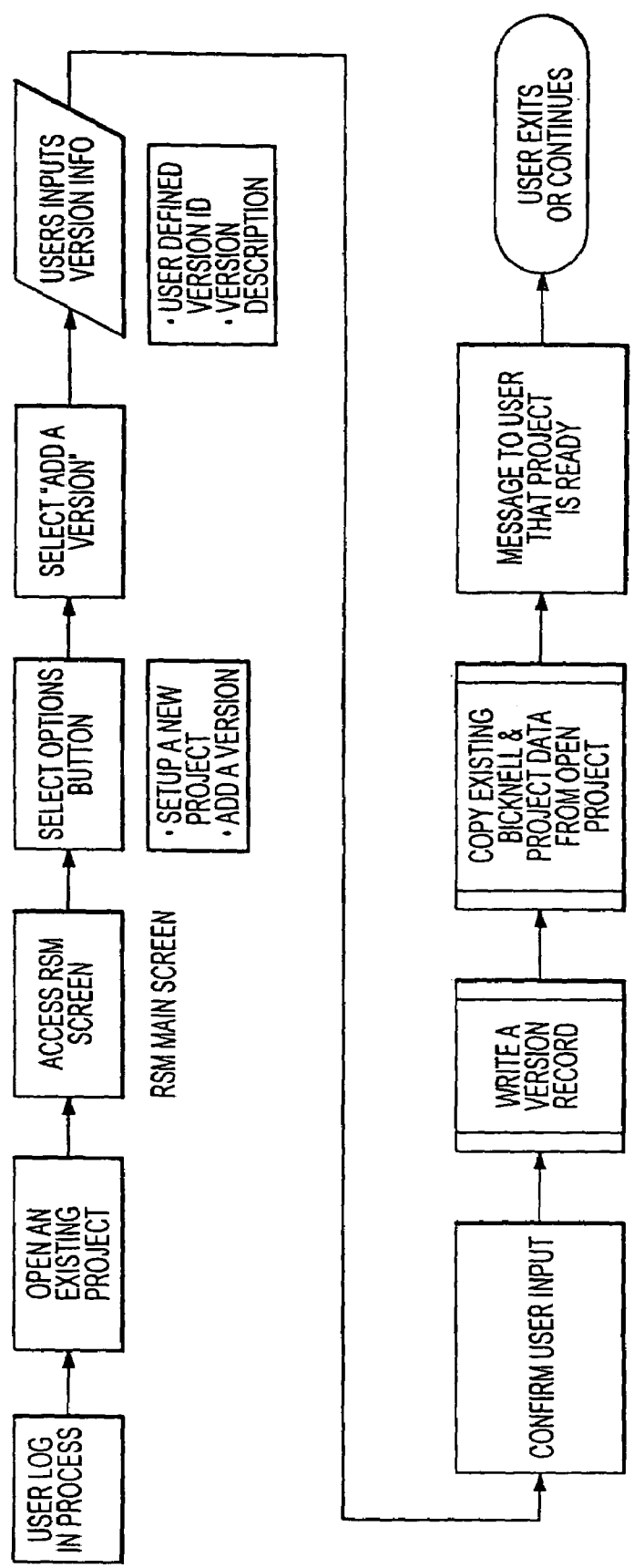
FIG. 17 is a flow diagram showing a particular embodiment of the create a version subroutine of the computer implemented project planning tool.

Referring to FIG. 17, the main project planning application provides a Create A Version subroutine (shown by FIG. 1 as subroutine 2.1.8). With this subroutine, the project planning tool user may create a version of an existing project plan. The main project planning application navigates the user to the create a version subroutine by generating an options prompt and an add a version prompt. Upon accessing the create a version subroutine the project planning tool user then inputs a version identifying description into the fields generated by the Create A Version subroutine. The version information may include a user defined version identification details or a version description. The create a version subroutine may then confirm the project planning tool user's input and write a version record. Project data from the existing project plan is then copied to the version record. The create a version subroutine then generates a message to the project planning tool user that the version is ready. The project planning tool user may then review and tailor task content as described above.

Figure 18:
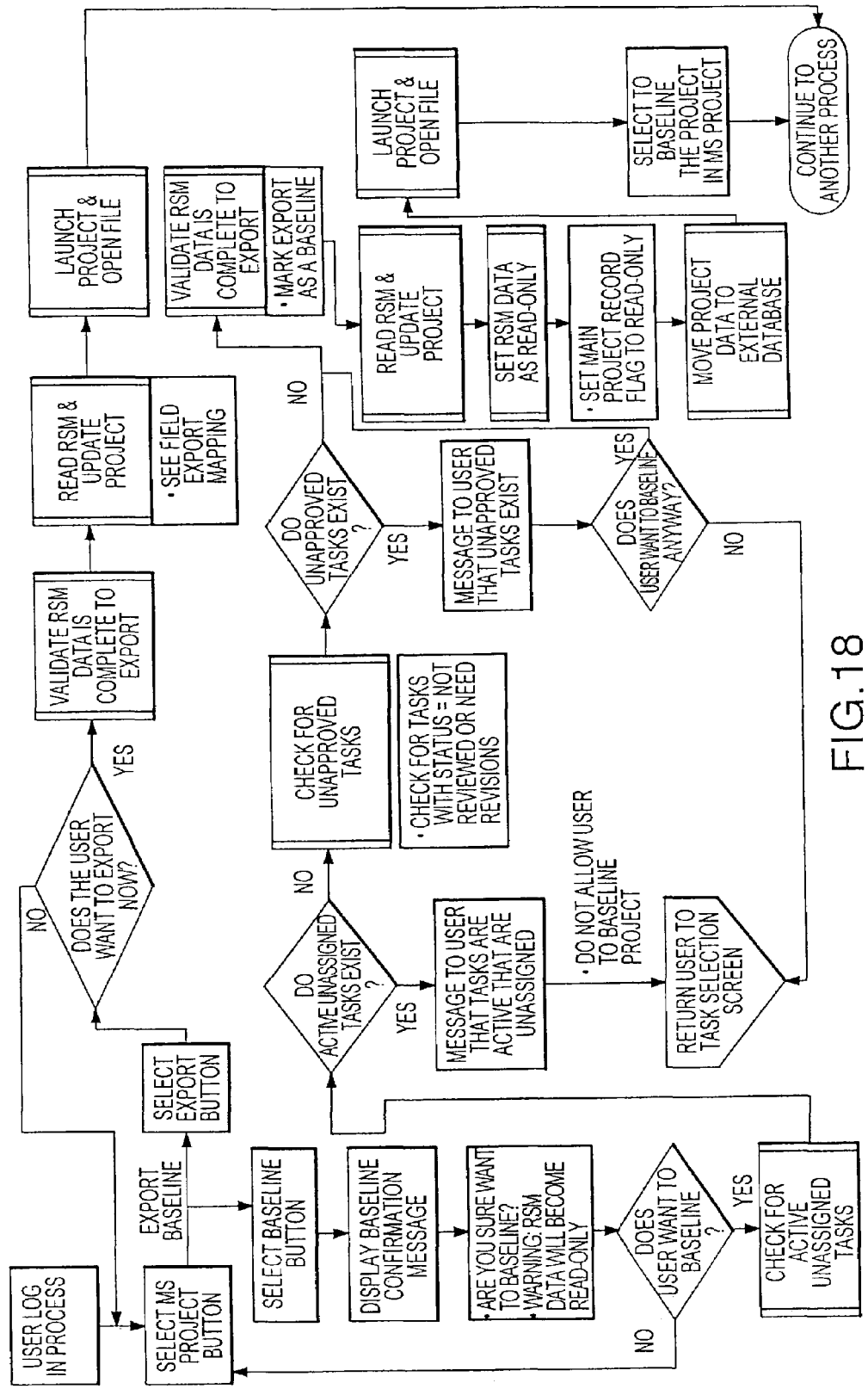
FIG. 18 is a flow diagram showing a particular embodiment of the exporting data subroutine of the computer implemented project planning tool.

Referring to FIG. 18, the main project planning application may further comprise a Data Exporting subroutine (shown by FIG. 1 as subroutine 2.1.11). The data exporting subroutine may export task details to at least one external database. The task details are a portion of the task content within the content loaded project planning templates. The task details within a content loaded project planning template are linked. Similarly, task details between more than one content loaded project planning templates have dependencies assigned as described above. The external database could be a scheduling tool such as MS Project or a spread sheet as Lotus as but two examples.

The external database may be automatically populated with the task details by the data exporting subroutine. Populating the external database may comprise exporting task details to assigned fields within the external database. The task details may then be subsequently saved as part of external database. An output from the external data base could then contain the task details exported from the project planning tool. This output from the external database could be an electronic or hard copy spread sheet or project schedule as examples.

Importantly, the data exporting subroutine preserves links between at least one task detail when exporting at least one task detail from project planning tool to the external database. Preservation the links between task details allows exporting of the task details as an integrated packet of information. The exporting subroutine may also preserves the links between task details within the external database. By preserving these links a function applied to one task detail applies to all the linked task details. For example, when a task detail is deleted from the external database all the linked task details are deleted from the external database simultaneously.

The data exporting subroutine also preserves the dependency between the task details when exporting the task details from the project planning tool to the external database. The exporting subroutine may also preserve dependency between task details within the external database. The dependencies may be automatically preserved such that the project planning tool user would not have to be prompted to reassign or approve the dependencies within the external database. By preserving the dependency between task details the task details may be automatically scheduled within the external database without further effort on the part of the project planning tool user or the external database user. Moreover, the exporting subroutine may also preserve the dependancy between task details upon deleting a task detail from the external database. This aspect of the exporting subroutine further comprises generating a replacement dependency automatically between task details having a dependency to the deleted task details.

Figure 19:
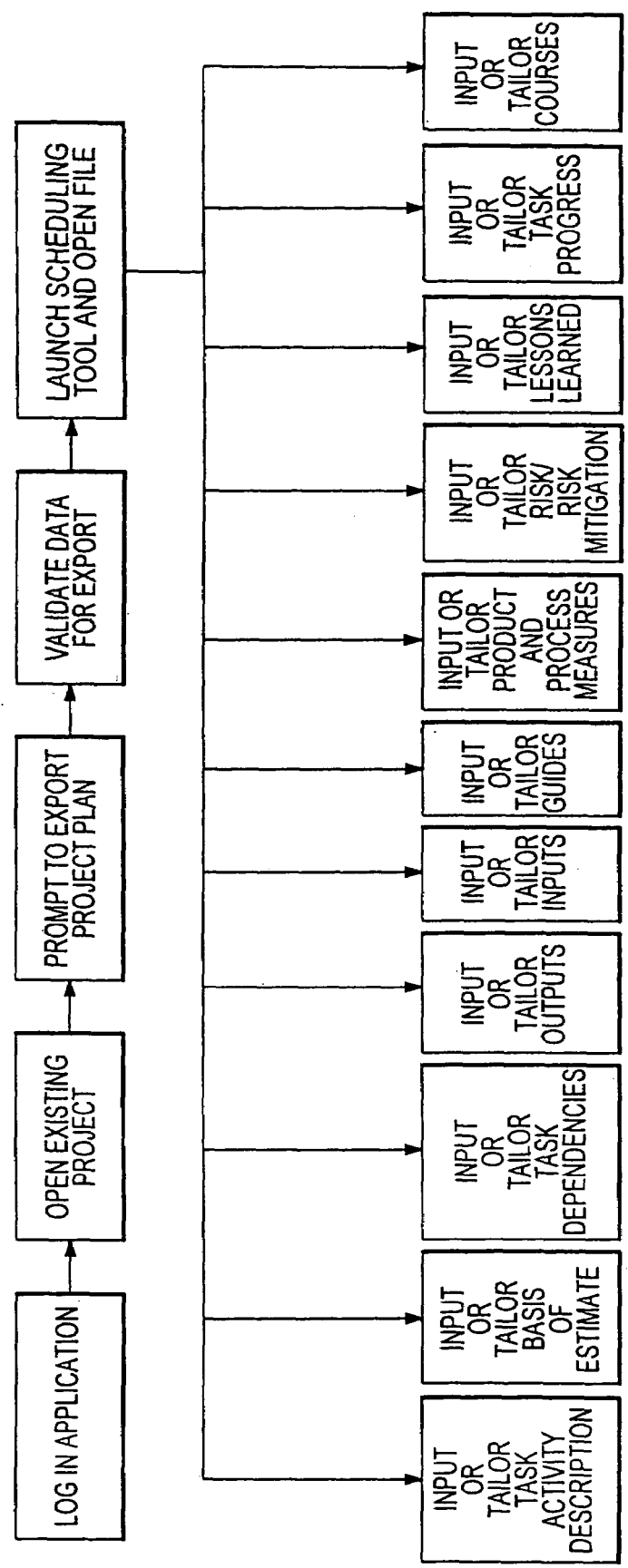
FIG. 19 is a flow diagram showing a how a particular embodiment of the exporting data subroutine automatically populates an external database.

As shown by FIG. 18, the project planning tool user may be navigated through the data exporting subroutine by project planning prompts. Project planning prompts may allow the project planning user to select the export subroutine and then may allow the project planning user to confirm if the project planning user wants to export the task details. The exporting data subroutine may also validate that the data to export is complete. As shown by FIG. 19, the exporting data subroutine may also automatically launch the external data base. It may also automatically open the file within the external database which may be populated with task details from the project planning tool. The file is then automatically populated with task details.

Figure 20:
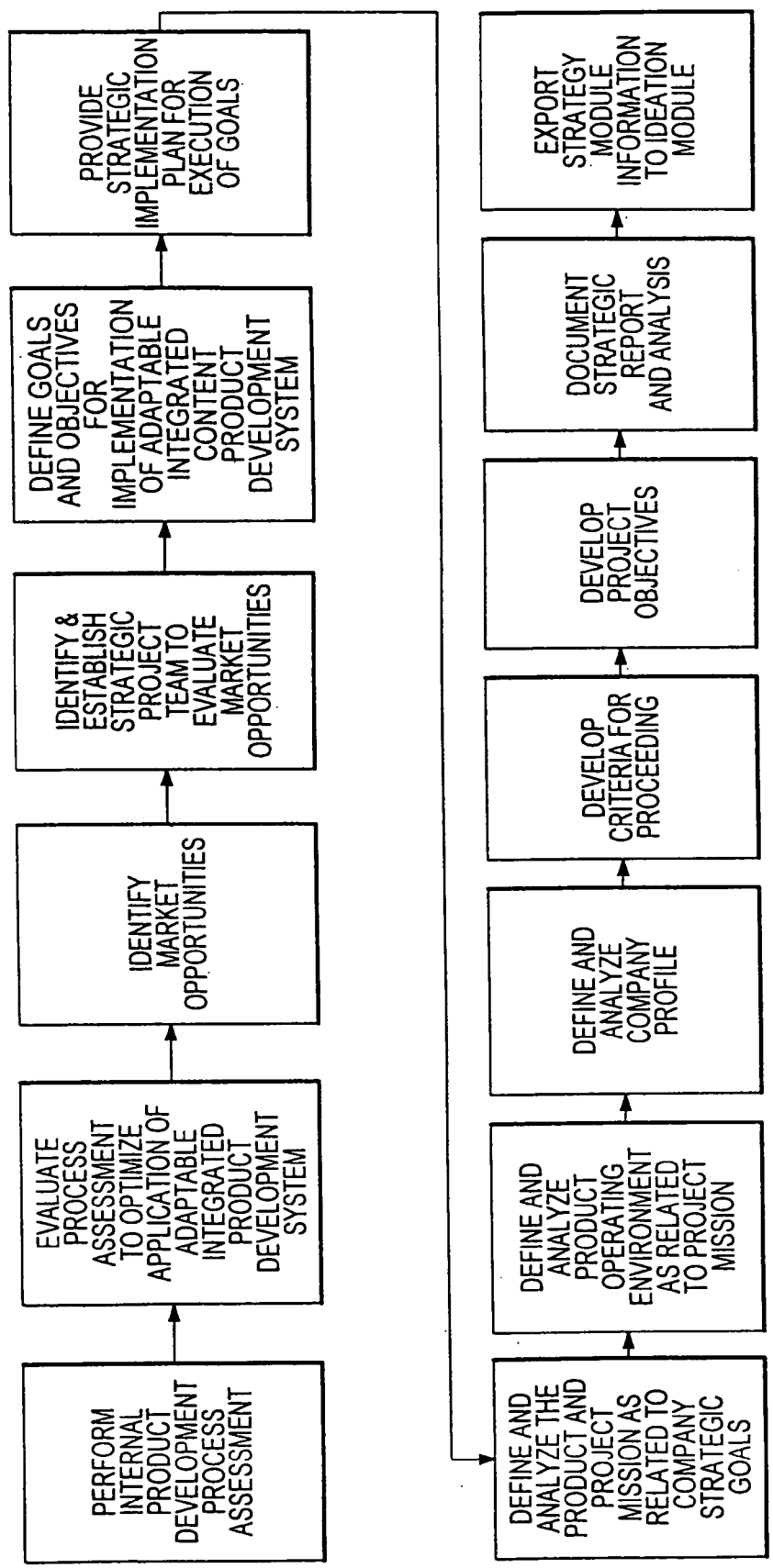
FIG. 20 is a flow diagram of a particular embodiment of the strategy module operations concept within the product development system.
Figure 26:
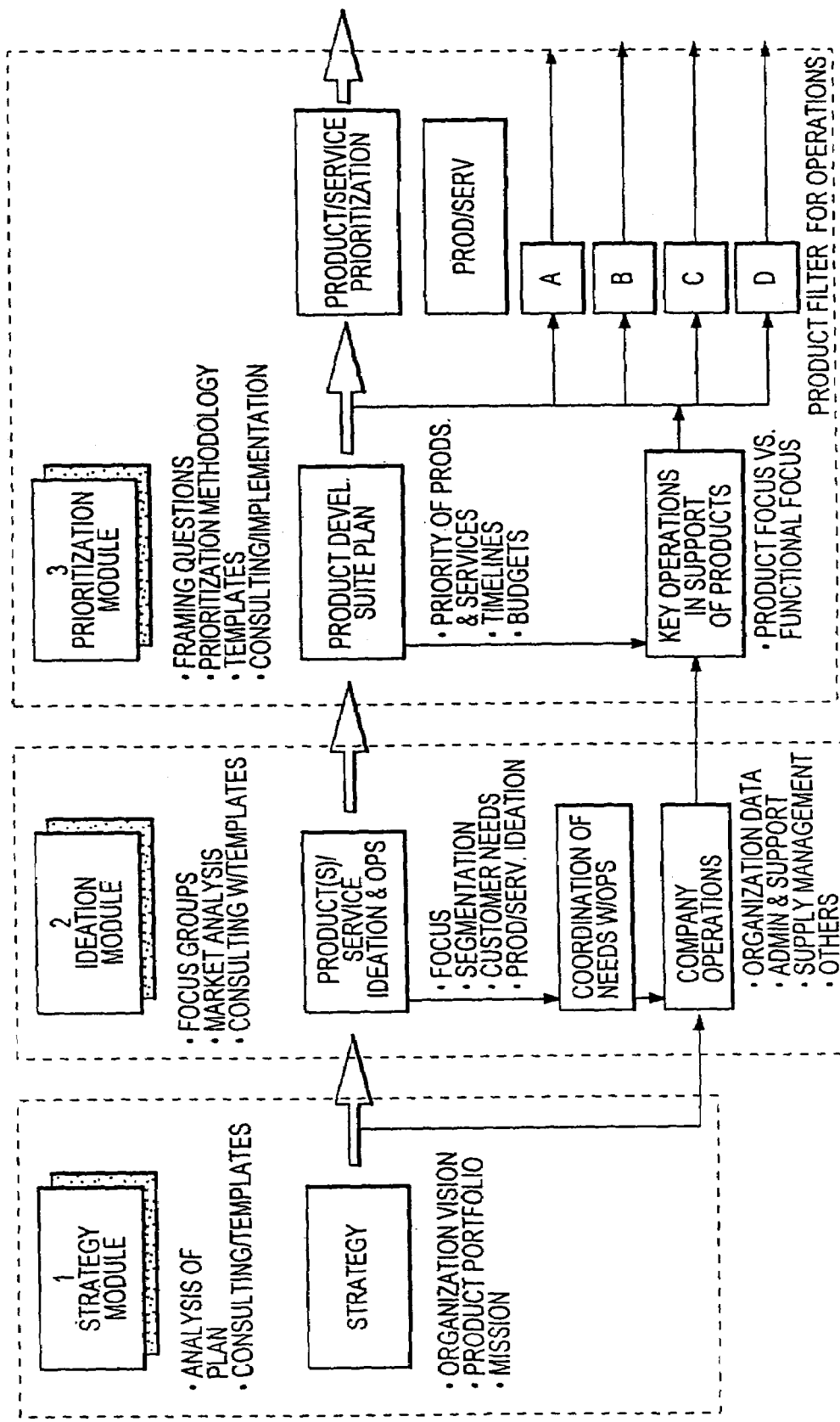
FIG. 26 is a flow diagram showing the application of modules 1, 2, and 3 to the development of a product or a service.

With respect to the first module of the invention and referring to FIGS. 20 and 26, the invention uses methods to gather information in the strategy stage of product development. Through the use of various information organization techniques, the strategy for the product(s) are templated and organized to yield a vision and be compiled into a repository for the organization for use during the product development life cycle, and for usage by the organizations various functions in reporting and creating measures for future products. One of the key elements of this phase is the creation of the information stream in such as manner as to affect ease of communication throughout the organization for further use and memorialization as part of the repeatability afforded by the invention. The first step within the strategy module may be to assemble the product development advisory team based upon the recommendations of the skill sets and data sources in the company. FIG. 20 describes the approach to starting the product development process and contains the activities and embodies the approach of the invention to accomplish the collection of the data and analysis necessary for establishing the strategy. This is accomplished based upon the advisory tool that prompts the user through a selection of desired outcomes and results from the product development system. The user then performs the internal product development process assessment. The user selects a content base reflective of the industry or market area of the user company. This content base contains a templated list of categorized questions and research areas that are to be completed by the user. The user can be a single individual or can utilize the prompted list of potential resource areas and individuals in a company that can provide support in providing data to the user. The internal product development process assessment tool organizes the information by utilizing a prompting process for comparative analysis of the capabilities existing in the user company for product development. The tool is the repository for the data collected and allows for a filtering and analysis function for determining the strengths and weaknesses in the current company product development process. It also benchmarks the abilities of the company in product development against a set of criteria established in the data repository for industry segments. This is accomplished automatically by the tool after data input into the repository and creates a structured and content-based data set for analysis.

The invention evaluates the current product development activities and areas of the company, determines the structure, and examines the areas of focus for improvement based upon selected criteria from predefined analysis sets. In this way the invention and the tool used determines product development gaps, the severity of gaps in various categories and determines measures for addressing the gaps and the weaknesses. The invention allows for a scoring of the importance of the product development categories for analysis.

The invention then examines the market opportunities for the industry or service segment the user company wishes to explore or develop. This is done utilizing a content rich database of information that the user selects from to determine detail. The content utilizes a method of linking to other data sources to update recent industry information and present a menu of options to the user for selection.

FIG. 20 shows that following the identification of market opportunities, the user company uses a content-based template for selection of key individuals to participate in identifying and further evaluating the market opportunities. Every company has a general idea of its market areas, but the invention sets forth roles and responsibilities to be fulfilled to select the key individuals to engage in utilizing the invention to maximize company benefit from the market areas in a sequential content-based approach. This is part of the guided process.

The invention provides a series of templates that yield specifically formatted information in steps 5 through 7 of the strategy module in FIG. 20. These steps organize the selection of overall goals for product development, determine the size and scope of the product development program internal to the company, create a plan for implementing the product development across the company and encompass all product develop activities for multiple products and services. The invention prompts the company user or team of users for necessary information identifying mission statements, determining measures of success and ensuring that there is alignment of these items with the company strategy. The invention also combines the information structure of the organization to include operations activities that may stretch across an organization and are not typically thought of as part of the product development process until later in the life cycle of the development.

The invention utilizes the templating process (Steps 8–9) to prompt the users to compile existing company and industry data into definable internal market segments, pricing strategies, competitive strategies, external and internal market influences (such as regulations) that can be analyzed. It also keeps the information in a consistent format that facilitates communication and comparison from product to product and year-to-year as the company migrates its product offering.

After completing this information, the user can use a defined set of filters to analyze the capability of the company to meet the strategy and market product offerings intended. The tool memorializes decision-making logic and incorporates it into the data repository (Steps 10 and 11), allowing the establishment of a user data repository for the information that will be carried through the remainder of the inventions tools for each module.

Critical to the uniqueness of the invention, the user can generate a report based on the prompted content stored in the data repository, and create analysis summaries (Step 12).

Unique to the invention is the ability to export (Step 13) strategic project information related to the generation of new products and concepts to the next phase (Ideation). This creates a traceable data repository of decision-making that has occurred in the invention. It creates the ability to track future modifications back to the corporate strategy to ensure consistent and market-linked communications.

Completion of the Strategy Module is defined by accomplishing the exit criteria defined during the module. This is accomplished by meeting the predefined goals and tasks detailed during the completion of the module. These goals and tasks are contained in the content base of the module and refined to the specifics of the product development outcomes needed to keep the product focused on the defined market segment.

Figure 21:
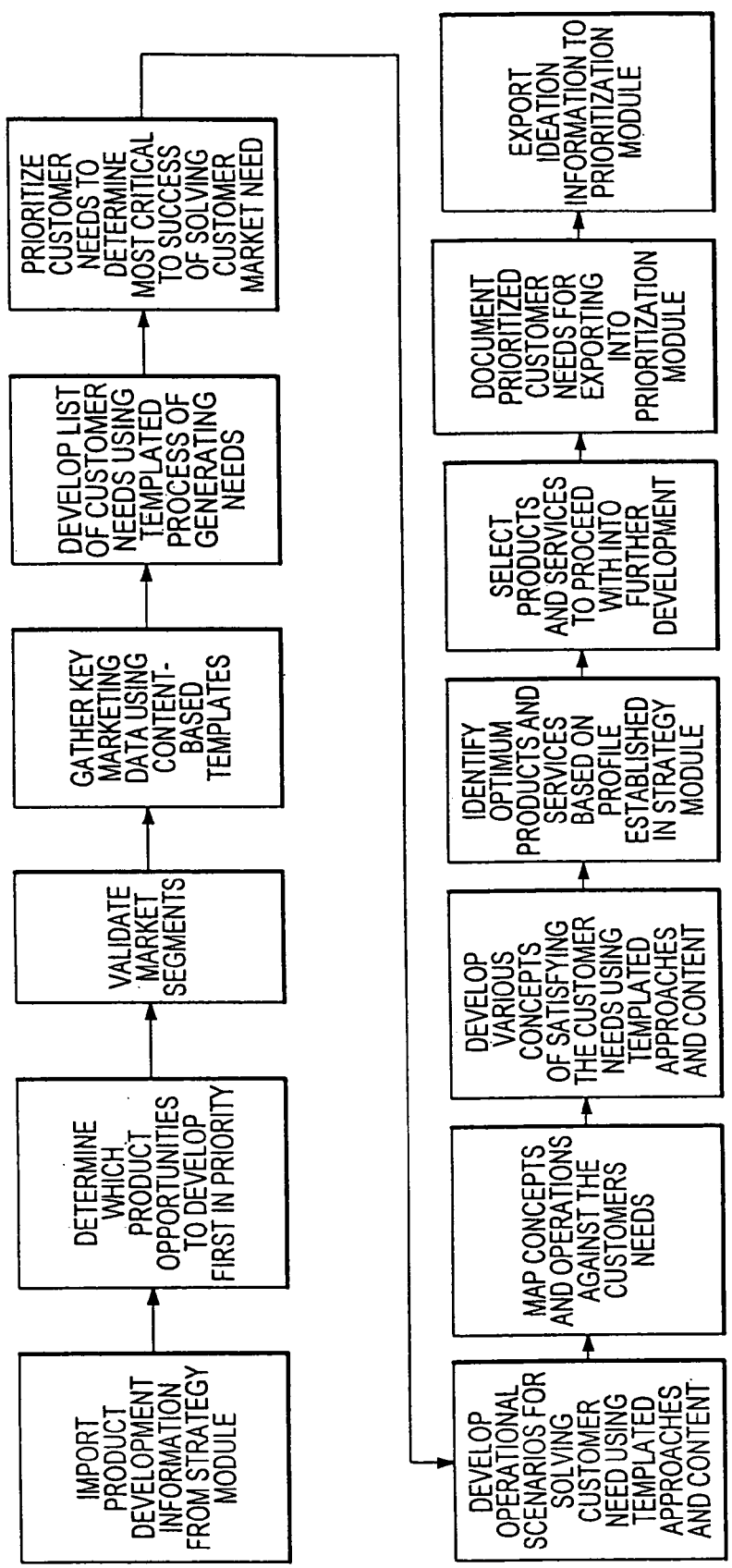
FIG. 21 is a flow diagram of a particular embodiment of the ideation module operations concept within the product development system.

Next, referring to FIGS. 21 and 26, module two involves product ideation. This stage of the invention involves the use of various applications of marketing intelligence gathering, focusing of purpose, identifying customer needs, generation new ideas, and compartmentalizing the results for analysis and transfer to the next stage of the process of the invention. Once again, the information is compiled using various methods that are applicable to the market area, target customer and other factors. The invention also combines the information structure of the organization to include operations activities that may stretch across an organization and are not typically thought of as part of the product development process until later in the life cycle of the development. This coordination is accomplished through tracking of the data extracted and created, and allows for prioritization of the key processes of product development through the invention. Once the data collected in the Strategy Module has been exported to the Ideation Module, FIG. 5 illustrates the inventions attributes for completing the next steps of the adaptable integrated-content product development system.

The data imported into the data repository for this module are examined through the use of a template containing criteria for evaluating the product, or in ranking the importance of the several products or groups of products identified in the Strategy Module. Prioritized products can then proceed individually through the adaptable integrated-content product development system using separate data repositories, or be treated as product families/groups for analysis and development.

Step 3 of FIG. 21 validates the market segments utilizing market analysis contained in templates utilizing information from the content-based data repository for the market. Also contained in this step of the invention is a feature connecting the invention to a separate set of market investigation data repositories and methods for collecting specific market information for inclusion in the invention's system. The invention recommends best approaches and data collection techniques for supporting the market segment analysis. This is accomplished through user-prompted and guided templates.

Once the choice of market gathering needs are defined by the invention, the user group or company begins the structured collection of marketing information that is then placed in hierarchical categories relating to importance to the customer target market. This is accomplished in Steps 4 through 6 of FIG. 21. The approach of the invention embodies the ability to order and structure the data collection procedure for repeatability and involves the customer in a unique discovery method that not only allows for the defining of the needs of the customer for the new product/service, but also creates a unique rapport among a customer base. The templates in the invention permit the user to proceed in an ordered fashion in gathering the attributes necessary to satisfy the customers' needs for balancing functionality and purpose of the product with cost and delivery constraints. Step 6 of FIG. 5 utilizes a prioritization technique for qualitatively evaluating the importance of various features of the product and needs of the customer for the product function in order to allow the user to concentrate resources on the most critical success items of the product. The invention utilizes this prioritization method and creates groups or sets of features that are related in function or purpose. The invention also prescribes a method of approaching customers for gathering this information that is complimentary to placing the user in a unique partnership with the customer and creates a working relationship increasing the chances of success for the product.

One of the major problems in product development is the ability to foresee the usage of a product in the customer's environment. The invention addresses this problem in Steps 7 through 9 of FIG. 5 through the implementation of a method called operational scenario mapping. The invention describes various needs of the customer through how the customer addresses satisfying the overall requirement for the product. The customer joins with the user in defining the steps of a problem meant to be solved by the product, and thereby often reveals either new or unforeseen applications of the product, or provides intelligence on the real core value proposition of the product function. The invention utilizes the content-based templates identified from the invention's data repository for the industry segment to aid in the operational scenario development. The templates map the characteristics of the product functionality against the elements desired by the customer using templated approaches that prompt the user to make selections for further refinement later in the adaptable integrated-content product development system. From this mapping, various concepts of satisfying the customer through the new product can be developed and configuration controlled as described in step 9 by FIG. 21. A high-level concept generator is employed by the invention that structure and guides the user through the creation process. The generator incorporates the various functions of the product usage including receipt, unpacking or set-up, application, storage, transportation, maintenance, product support and disposal or retirement.

Steps 10 and 11 shown by FIG. 21 illustrate how the invention then ensures, through the use of content templates and the data repository generated, the best concepts to take forward through the rest of the adaptable integrated-content product development system. Content-based user-prompted and guided templates assist in the selection of the most promising concepts for further development, thus maximizing value in the development, and potential for successful product launch.

Steps 12 and 13 utilize the documentation methodology of the invention and the exporting functions previously described in the Strategy Module. These functions transfer the prioritized customer needs information and the selected concepts into the data repository for export to the prioritization module.

Figure 22:
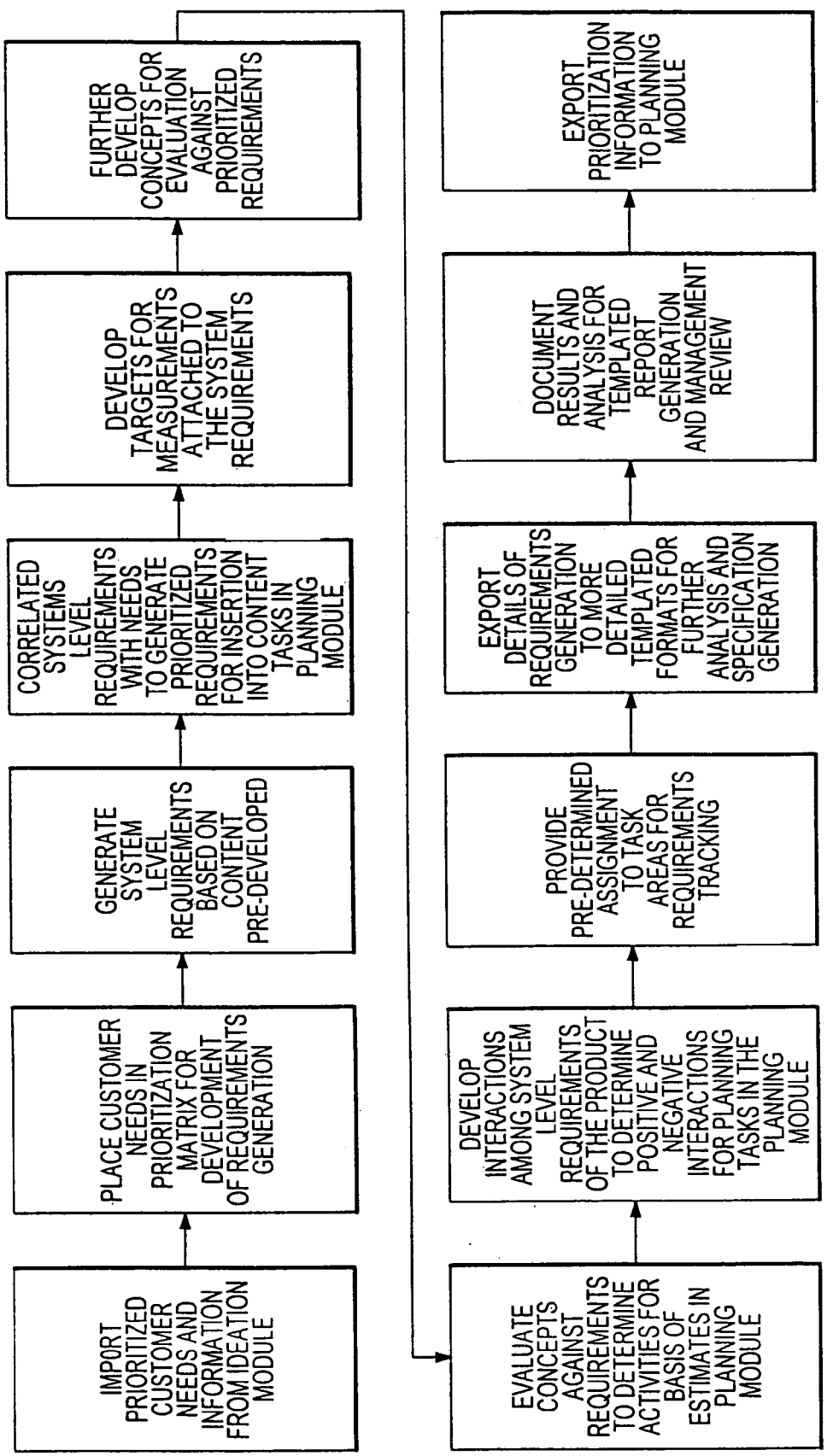
FIG. 22 is a flow diagram of a particular embodiment of the prioritization module operations concept within the product development system.

Refering next to FIGS. 22 and 26, the third module of the invention utilizes a prioritization method that can take shape in various forms as necessary for the needs of the application. In this basic form, the invention acts to gather the information, prioritize it and provide the organization with a result that allows implementation of specific tasks that are contained in the planning module. This reduces time and error in development of products. The various organization support activities are also included in this activity and are taken out of this prioritization phase into the planning module that operates to use various data sorting techniques to provide a product filter for these operations. By that, the inventors mean to state that the invention operates to filter out less important activities from key activities that are essential to the successful launch and sales of the products and services.

The prioritization Module is shown by FIG. 26, and includes the process and strategies described in the book *The Road Map to Repeatable Success: Using QFD to Implement Change* ("Road Map Book") hereby incorporated by reference. The invention provides an automated and integrated approach to prioritize customer needs in relationship to system requirements necessary before proceeding to the planning module portion of the invention. The prioritization module steps include the ability to automatically incorporate the data repository information resident in the invention and generated in the previous modules, as well as offering simultaneous utilization of the tool to create multiple matrices and data repositories for multiple-linked products or product families.

In addition to the information contained in the Road Map Book, the prioritization module automatically connects the template-generated requirements to the market segment content repository to enable the linking features of the Planning Module (Steps 3–7 of FIG. 26). This allows the invention to create assignment of the predetermined tasks to requirements and targets or measures and uniquely maintain configuration management of the information. The prioritization of the requirements and relationship to the selected product concepts are exported as well to the Planning Module to allow the selection and commitment of resources effectively.

All of these elements combine to create the continuous linkage of elements and details to the corporate strategy and top-level assumptions created in the Strategy Module. Analysis and competency templates are automatically employed to evaluate the accuracy and completeness of the information contained in the matrix data repository generated during this phase.

This information is then documented using prompted user templates and placed in the data repository for export to the Planning Module (Steps 11 and 12 in FIG. 6)

Figure 27:
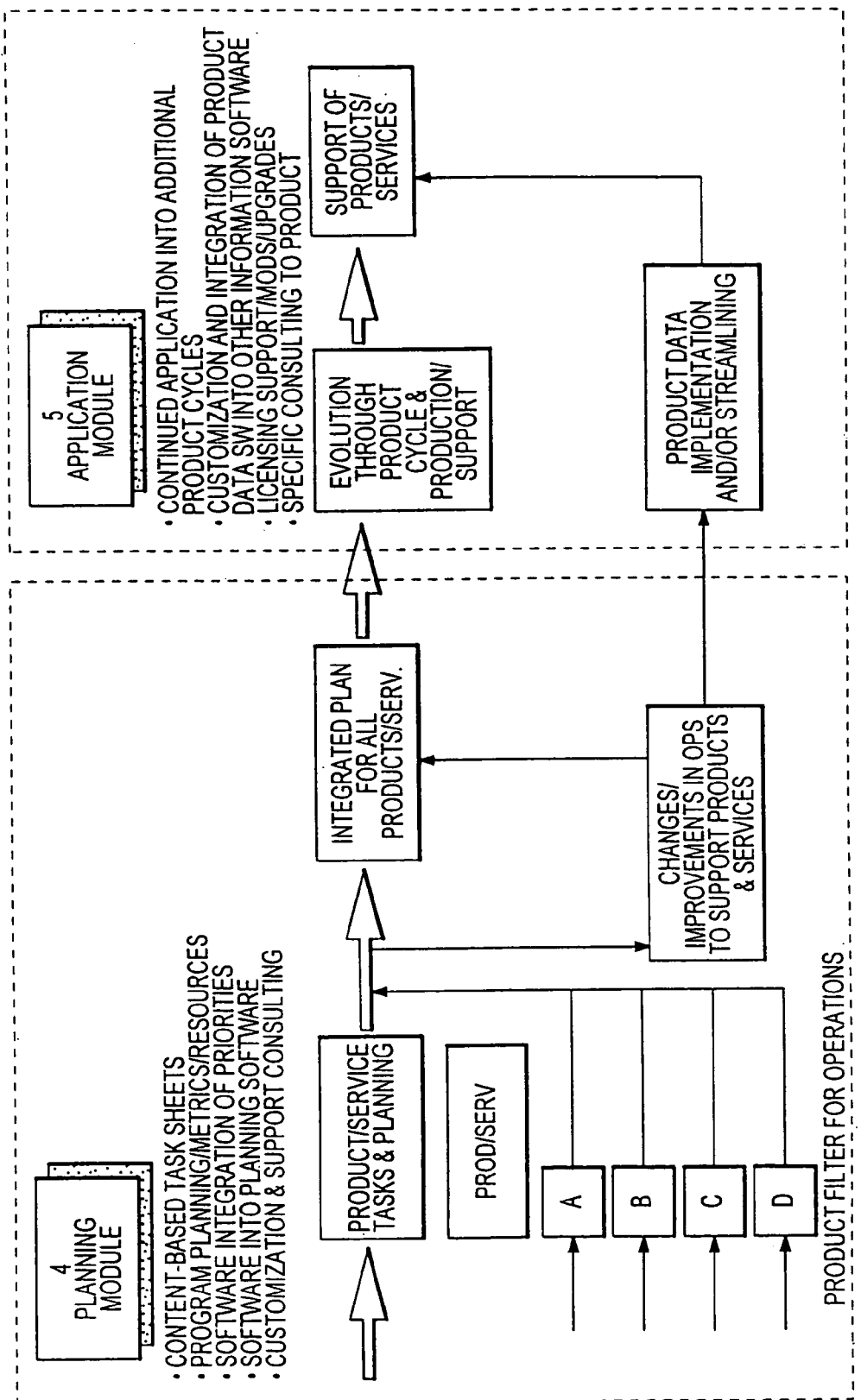
FIG. 27 is a flow diagram showing the application of modules 4 and 5 to the development of a product or a service.

Referring now to FIG. 27 and as described in the preceding text, the fourth module comprises a planning module that utilizes content-based information templates that track such things as description of the tasks, metrics for measuring the efficacy of the task and the product and service, planning and scheduling criteria, data gathering for repeatability on future or similar products and services, product cycle inputs and outputs, training requirements, and connections to other information storage and retrieval systems in the organization.

Figure 23:
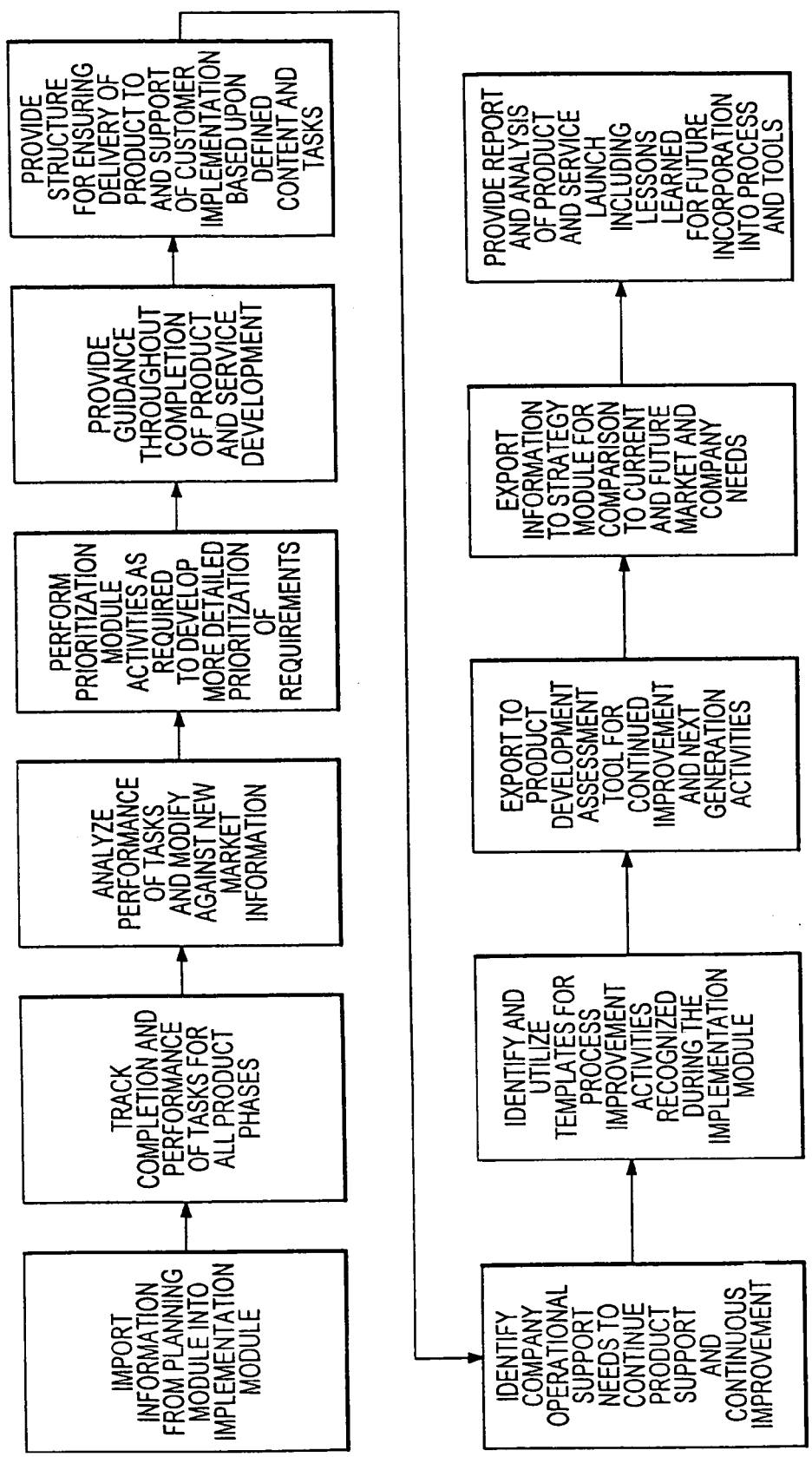
FIG. 23 is a flow diagram of a particular embodiment of the implementation module operations concept.

Finally, referring to FIGS. 23 and 27, the fifth module of the invention utilizes the information created and gathered up to this point to apply it to the production and support of the product. It also identifies other areas of the organization for improvement to aid in the success of the product/service, and assists the organization through the use of various feedback mechanisms for improvement and documentation; thus providing the repeatability in the product development needs of the organization.

FIG. 27 illustrates the embodiment and use of the Implementation Module. In general, the 11 steps of the implementation module complete the invention, but also uniquely allow for feedback to the strategy module for improvement of the product and incorporation of key measures for determining success and offer automatic updating of lessons learned, the mechanism which is also described in FIG. 24, and integration techniques.

Figure 24:
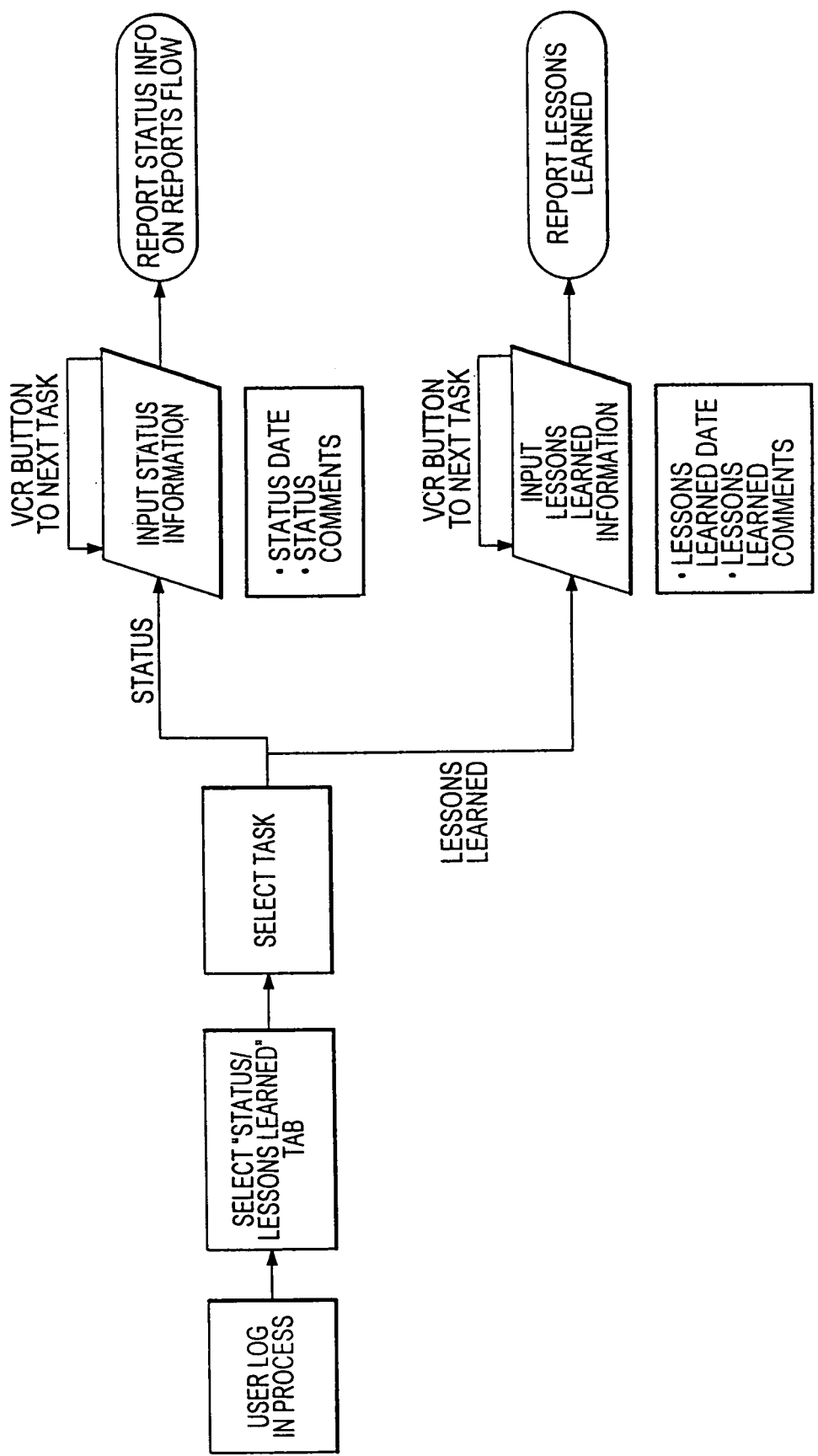
FIG. 24 is a flow diagram of a particular embodiment of the status management subroutine within the implementation module.
Figure 25:
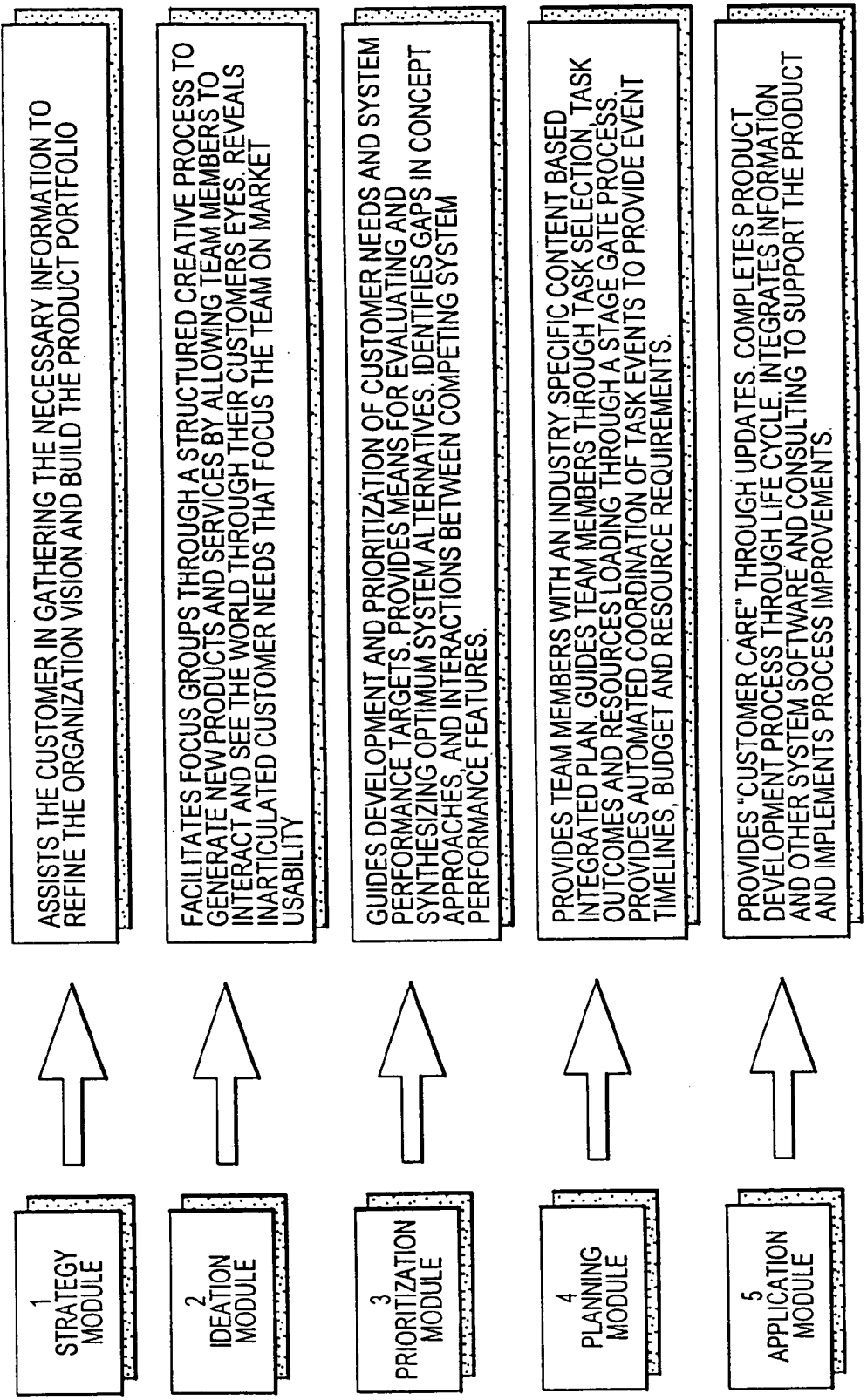
FIG. 25 is a block diagram showing the high level concept for the adaptable integrated content product development system.

After importing the data repository information from the planning module (Step 1 in FIG. 27) the data is tracked to completion through the six Life Cycle Development Phases described in the Planning Module. The invention used a tool to continue the tracking and allowing for the analysis of task progress, create "what if" scenarios (event anticipation), and allow for the modification of activities based upon input of external product development variations such as technology changes, market changes, or regulatory impacts. (See Steps 2 through 4 of FIG. 27.) Refer to FIG. 24 for description of the task progress index. Task 4 also incorporates the iterative use of the Prioritization and Planning Modules to product more detailed tasks and iteration both vertically in the skill set areas, and horizontally in the Modules and Life Cycle phases.

Guidance is provided through the product progression to completion through a guided methodology of templates and subject matter guides.

Company operational support needs continue to be utilized and guided into the product development ensuring that the company support of the product delivery has been met through the completion of defined tasks and phased exit criteria for each Life Cycle Phase. This module of the invention utilizes templates (content loaded for industry/market segment) for process improvement and provides for the inclusion of linkages to additional sources for techniques to be utilized within the defined industry that maximizes efficiency and skill set excellence.

The Implementation Module also provides an automated ability to export data from the project data repository into a comparison template to determine areas of product development difficulties, and ensure an ability to learn from the product development effort. Filtering of data elements for determination of trends and success improvement opportunities can be developed through user guided methods.

Finally, the reporting and documentation techniques of the previous modules are employed to product data analysis and management review capability for future strategic and financial decision-making.

It is thought that the apparatuses and methods of the embodiments of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, and as but one example the disclosure of "a content loaded project planning template generator" or "a means for generating a content loaded project planning template generator" should be understood to encompass disclosure of the act of "generating a content loaded project planning template"—whether explicitly discussed or not—and, conversely, were there only disclosure of the act of "generating a content loaded project planning template ", such a disclosure should be understood to encompass disclosure of "a means for generating a content loaded project planning template" or "a content loaded project planning template". Such changes and alternative terms are to be understood to be explicitly included in the description.

Any references mentioned, including but not limited to federal or state statutes, patents, publications, brochures, marketing materials, or inter-net pages, in this patent application, are hereby incorporated by reference or should be considered as additional text or as an additional exhibits or attachments to this application to the extent permitted; however, to the extent statements might be considered inconsistent with the patenting of this/these invention(s) such statements are expressly not to be considered as made by the applicant. Further, the disclosure should be understood to include support for each feature, component, and step shown as separate and independent inventions as well as the various combinations and permutations of each.

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

We claim:

1. A computer implemented project planning system stored on a computer readable medium, comprising:
    a) a computer implemented content loaded project planning template generator which creates a plurality of content loaded project planning templates;
    b) a hierarchical project planning architecture organizational element which operates on said plurality of content loaded project planning templates;
    c) a computerized project planning tool which acts upon said content loaded project planning templates as they are organized into said hierarchical project planning architecture; and
    d) a computer implemented user interaction element on a computer readable medium to which said computerized project planning tool is responsive and configured to interact with a computerized project planning tool.

2. A computer implemented project planning system as described in claim 1, further comprising a computer implemented task content index generator configured to generate a task content index within plurality of content loaded project planning templates.

3. A computer implemented project planning system as described in claim 2, further comprising a selectable linked task content generator configured to generate a selectable linked task content within said task content index.

4. A computer implemented project planning system as described in claim 3, wherein said selectable linked task content generator comprises a task activity description element.

5. A computer implemented project planning system as described in claim 3, wherein said selectable linked task content generator comprises a basis of estimate generator.

6. A computer implemented project planning system as described in claim 3, wherein said selectable linked task content generator comprises an output generator.

7. A computer implemented project planning system as described in claim 3, wherein said selectable linked task content generator comprises an input generator.

8. A computer implemented project planning system as described in claim 3, wherein said selectable linked task content generator comprises a guide generator.

9. A computer implemented project planning system as described in claim 3, wherein said selectable linked task content generator comprises a risk/risk mitigation generator.

10. A computer implemented project planning system as described in claim 3, wherein said selectable linked task content generator comprises a process measure and product measure generator.

11. A computer implemented project planning system as described in claim 3, wherein said selectable linked task content generator comprises a task progress generator.

12. A computer implemented project planning system as described in claim 3, wherein said selectable linked task content generator comprises a lessons learned generator.

13. A computer implemented project planning system as described in claim 3, wherein said selectable linked task content generator comprises a courses generator.

14. A computer implemented project planning system as described in claim 13, further comprising a dependency generator.

15. A computer implemented project planning system as described in claim 14, wherein said dependency generator capable of a dependency between said selectable linked task content of at least two of said plurality of content loaded project planning templates.

16. A computer implemented project planning system as described in claim 1, further comprising a computer implemented task generator, wherein said task generator generates at least one task and further comprising a tailor element to which at least one said task is responsive.

17. A computer implemented project planning system as described in claim 16, and further comprising a tailored task detail memory element which is responsive to said tailor element and to which is responsive said content loaded project planning templates.

18. A computer implemented project planning system as described in claim 17, and further comprising an update element to which is responsive to said tailor element and to which is responsive said computerized project planning tool.

19. A computer implemented project planning system as described in claim 1, wherein said hierarchical project planning architecture organizational element further comprises a selectable task list generator.

20. A computer implemented project planning system as described in claim 19, wherein said hierarchical project planning architecture organizational element further comprises a skill set selector.

21. A computer implemented project planning system as described in claim 20, wherein said hierarchical project planning architecture organizational element further comprises a product development phase selector.

22. A computer implemented project planning system as described in claim 21, wherein said hierarchical project planning architecture organizational element further comprises a product development phase selector which selects from the group consisting of Concept Definition; System Definition; Design; Design Validation; Fabrication, Assembly, Integration, Test (FAIT); and ProductionCustomer Support.

23. A computer implemented project planning system as described in claim 1, wherein said computer implemented user interaction element to which said computerized project planning tool is responsive comprises a project planning prompt generator which guides said computerized project planning tool user through said hierarchical project planning architecture.

24. A computer implemented project planning system as described in claim 23, wherein said project planning prompt generator which guides said computerized project planning tool user through said hierarchical project planning architecture comprises a vertical hierarchical project planning prompt generator.

25. A computer implemented project planning system as described in claim 23, wherein said project planning prompt generator which guides said computerized project planning tool user through said hierarchical project planning architecture comprises a content loaded horizontal hierarchical project planning prompt generator.

26. A computer implemented method of project planning, comprising the steps of:
  a) generating content loaded project planning templates;
  b) organizing said content loaded project planning templates into a hierarchical project planning architecture;
  c) maintaining said content loaded project planning templates organized into said hierarchical project planning architecture within a computerized project planning tool; and
  d) configuring said computerized project planning tool to interact with a computerized project planning tool user.

27. A computer implemented method of project planning as described in claim 26, further comprising the step of generating a project planning task content index within said at least one content loaded project planning task.

28. computer implemented method of project planning as described in claim 27, further comprising the step of generating selectable linked task content within said project planning task index.

29. A computer implemented method of project planning as described in claim 28, wherein said step of generating selectable linked task content within said project planning task index comprises generating a task activity description.

30. A computer implemented method of project planning as described in claim 28, wherein said step of generating selectable linked task content within said project planning task index comprises generating a basis of estimate.

31. A computer implemented method of project planning as described in claim 28, wherein said step of generating selectable linked task content within said project planning task index comprises generating outputs.

32. A computer implemented method of project planning as described in claim 28, wherein said step of generating selectable linked task content within said project planning task index comprises generating inputs.

33. A computer implemented method of project planning as described in claim 28, wherein said step of generating selectable linked task content within said project planning task index comprises generating guides.

34. A computer implemented method of project planning as described in claim 28, wherein said step of generating selectable linked task content within said project planning task index comprises generating risk/risk mitigations.

35. A computer implemented method of project planning as described in claim 28, wherein said step of generating selectable linked task content within said project planning task index comprises generating process measures and product measures.

36. A computer implemented method of project planning as described in claim 28, wherein said step of generating selectable linked task content within said project planning task index comprises generating lessons learned.

37. A computer implemented method of project planning as described in claim 28, wherein said step of generating selectable linked task content within said project planning task index comprises generating task progress.

38. A computer implemented method of project planning as described in claim 28, wherein said step of generating selectable linked task content within said project planning task index comprises courses.

39. A computer implemented project planning system as described in claim 38, further comprises the step of generating dependency.

40. A computer implemented project planning system as described in claim 39, wherein said step of generating dependency comprises generating a dependency between said selectable linked task content of at least two of said plurality of content loaded project planning templates.

41. A computer implemented method of project planning as described in any one of claims 29, 30, 31, 32, 33, 34, 35, 36, 37, 38, further comprising the step of tailoring task details of said selectable linked content loaded project planning task by said computerized project planning tool user.

42. A computer implemented method of project planning as described in claim 41, further comprising the step of saving tailored task details.

43. A computer implemented method of project planning as described in claim 42, further comprising the step of updating said computerized project planning tool with said tailored task details.

44. A computer implemented method of project planning as described in claim 26, wherein said step of organizing said content loaded project planning templates into a hierarchical project planning architecture further comprises the step of generating selectable task lists.

45. A computer implemented method of project planning as described in claim 44, wherein said step of organizing said content loaded project planning templates intp hierarchical project planning architecture further comprises the step of generating selectable skill sets.

46. A computer implemented method of project planning as described in claim 45, wherein said step of organizing said content loaded project planning templates into a hierarchical project planning architecture further comprises generating selectable product development phases.

47. A computer implemented method of project planning as described in claim 46, wherein said step of generating selectable product development phases comprises generating product development phases selected from the group consisting of Concept Definition; System Definition; Design; Design Validation; Fabrication, Assembly, Integration, Test (FAIT); and Production-Customer Support.

48. A content loaded project plan prepared by a computer implemented method of project planning as described in anyone of claims 26, 27, 28, 41, 42, 44, 45, 46.

49. A computer implemented method of project planning as described in claim 26, wherein said step of configuring said computerized project planning tool to interact with a computerized project planning tool user comprises generating project planning prompts to guide said computerized project planning tool user through said hierarchical project planning architecture.

50. A computer implemented method of project planning as described in claim 49, wherein said step of generating project planning prompts to guide said computerized project planning tool user through said hierarchical project planning architecture comprises vertical hierarchical project planning prompts.

51. A computer implemented method of project planning as described in claim 49, wherein said step of generating project planning prompts to guide said computerized project planning tool user through said hierarchical project planning architecture comprises content loaded horizontal hierarchical project planning prompts.

52. A computer implemented project planning system stored on a computer readable medium, comprising:
   a) a computer implemented navigator having computerized project planning prompts which guides a project planning tool user through a hierarchical project planning architecture;
   b) a planning prompt generator;
   c) a task list access element
   d) a task list generator responsive to said task list access element having selectable task generators;
   e) a content loaded project planning template responsive to said task. generator;
   f) a guide element having task content relative to said content loaded project planning template;
   g) a task detail tailor element to which tailored task details are responsive and to which said content loaded project planning template is responsive;
   h) a prompt element to which said task detail tailor element is responsive;
   i) a tailored task detail memory element; and
   j) a content loaded project planning template generator which generates at least one content loaded project planning template having tailored task details on a computer readable medium.

53. A computer implemented project planning system as described in claim 52, wherein said guide element having task content relative to said content loaded project planning template further comprises a task content selector having a task content index.

54. A computer implemented project planning system as described in claim 53, wherein said task content index comprises a task activity description selector.

55. A computer implemented project planning system as described in claim 53, wherein said task content index comprises a basis of estimate selector.

56. A computer implemented project planning system as described in claim 53, wherein said task content index comprises an output selector.

57. A computer implemented project planning system as described in claim 53, wherein said task content index comprises an input selector.

58. A computer implemented project planning system as described in claim 53, wherein said task content index comprises a guide selector.

59. A computer implemented project planning system as described in claim 53, wherein said task content index comprises a process measure and product measures selector.

60. A computer implemented project planning system as described in claim 53, wherein said task content index comprises a task progress selector.

61. A computer implemented project planning system as described in claim 53, wherein said task content index comprises a risk/risk mitigation selector.

62. A computer implemented project planning system as described in claim 53, wherein said task content index comprises a lessons learned selector.

63. A computer implemented project planning system as described in claim 53, wherein said task content index comprises a course selector.

64. A computer implemented method of project planning as described in claim 53, wherein said task detail tailor element to which said content loaded project planning template is responsive comprises an activity description tailor element.

65. A computer implemented method of project planning as described in claim 64, wherein said task detail tailor element to which said content loaded project planning template is responsive comprises a basis of estimate tailor element.

66. A computer implemented method of project planning as described in claim 65, wherein said task detail tailor element to which said content loaded project planning template is responsive comprises an output tailor element.

67. A computer implemented method of project planning as described in claim 65, wherein said task detail tailor element to which said content loaded project planning template is responsive comprises an input tailor element.

68. A computer implemented method of project planning as described in claim 65, wherein said task detail tailor element to which said content loaded project planning template is responsive comprises an guides tailor element.

69. A computer implemented method of project planning as described in claim 65, wherein said task detail tailor element to which said content loaded project planning template is responsive comprises a task progress tailor element.

70. A computer implemented method of project planning as described in claim 65, wherein said task detail tailor element to which said content loaded project planning template is responsive comprises a risks/risk mitigation tailor element.

71. A computer implemented method of project planning as described in claim 65, wherein said task detail tailor element to which said content loaded project planning template is responsive comprises a process and product measures tailor element.

72. A computer implemented method of project planning as described in claim 65, wherein said task detail tailor element to which said content loaded project planning template is responsive comprises a lessons learned tailor element.

73. A computer implemented method of project planning as described in claim 65, wherein said task detail tailor element to which said content loaded project planning template is responsive comprises a courses tailor element.

74. A computer implemented method of project planning as described in claim 52, wherein said task list access element comprises a hierarchical level selector having at least one product development phase.

75. A computer implemented project planning system as described in claim 74, wherein said hierarchical level selector selects from the group consisting of Concept Definition; System Definition; Design; Design Validation; Fabrication, Assembly, Integration, Test (FAIT); and Production-Customer Support.

76. A computer implemented project planning system as described in claim 75, and further comprising a skill set selector.

77. A computer implemented project planning system as described in claim 52, and further comprising a tailored task detail export element to which a computerized project scheduling tool is responsive.

78. A computer implemented project planning system as described in claim 77, and further comprising a tailored task detail population element.

79. A computer implemented project planning system as described in claim 77, wherein said tailored task detail export element further comprises a link preservation element which is responsive to said tailored task detail export element.

80. A computer implemented project planning system as described in claim 79, wherein said link preservation element is further responsive to said tailored task detail population element.

81. A computer implemented project planning system as described in claim 80, and further comprising a tailored task detail deletion element and wherein said link preservation element is further responsive to said tailored task detail deletion element.

82. A computer implemented project planning system as described in claim 77, wherein said tailored task detail export element further comprises a dependency preservation element which is responsive to said tailored task detail export element.

83. A computer implemented project planning system as described in claim 82, wherein said dependency preservation element is further responsive to said tailored task detail population element.

84. A computer implemented project planning system as described in claim 83, wherein said dependency preservation element is further responsive to said tailored task detail deletion element.

85. A computer implemented project planning system as described in claim 52, and further comprising a ownership assignment element responsive to at least one content loaded task.

86. A computer implemented project planning system as described in claim 52, and further comprising a task assignment notification element.

87. A computer implemented project planning system as described in claim 86, and further comprising an additional task detail generator which communicates to at least one other computer user and responsive to at least one content loaded task.

88. A computer implemented project planning system as described in claim 87, and further comprising an additional task detail approval element.

89. A computer implemented project planning system as described in claim 88, and further comprising a filter responsive to said content loaded tasks.

90. A computer implemented method of project planning, comprising the steps of:
  a) navigating at least one project planning tool user through a computer implemented hierarchial project planning architecture having computerized project planning prompts;
  b) accessing a selectable task list having tasks;
  c) prompting at least one planning project user to select at least one task from said selectable task list;
  d) generating at least one content loaded project planning template responsive to said at least one task;
  e) guiding said at least one project planning tool user with task content within said at least one content loaded project planning template;
  f) prompting said at least one project planning tool user to tailor task details of said task content within said at least one content loaded project planning template;
  g) tailoring said task details of said task content within said at least one content loaded project planning template;
  h) saving tailored task details to memory of said at least one computerized project planning tool; and
  i) generating a content loaded project planning template having tailored task details.

91. A computer implemented method of project planning as described in claim 90, wherein said step of guiding said at least one project planning tool user with task content within said at least one content loaded project planning template comprises tutoring with selectable task content within a task content index.

92. A computer implemented method of project planning as described in claim 91, wherein said step of guiding with selectable task content within a task content index comprises selecting a task description.

93. A computer implemented method of project planning as described in claim 91, wherein said step of guiding with selectable task content within a task content index comprises selecting content a basis of estimate.

94. A computer implemented method of project planning as described in claim 91, wherein said step of guiding with selectable task content within a task content index comprises selecting outputs.

95. A computer implemented method of project planning as described in claim 91, wherein said step of guiding with selectable task content within a task content index comprises selecting inputs.

96. A computer implemented method of project planning as described in claim 91, wherein said step of guiding with selectable task content within a task content index comprises selecting guides.

97. A computer implemented method of project planning as described in claim 91, wherein said step of guiding with selectable task content within a task content index comprises selecting process measures and process measures.

98. A computer implemented method of project planning as described in claim 91, wherein said step of guiding with selectable task content within a task content index comprises selecting product task progress.

99. A computer implemented method of project planning as described in claim 91, wherein said step of guiding with selectable task content within a task content index comprises selecting risk/risk mitigations.

100. A computer implemented method of project planning as described in claim 91, wherein said step of guiding with selectable task content within a task content index comprises selecting lessons learned.

101. A computer implemented method of project planning as described in claim 91, wherein said step of guiding with selectable task content within a task content index comprises selecting courses.

102. A computer implemented method of project planning as described in claim 90, wherein said step of tailoring said task content within said at least one content loaded project planning template comprises tailoring activity descriptions.

103. A computer implemented method of project planning as described in claim 102, wherein said step of tailoring said task content within said at least one content loaded project planning template comprises tailoring said basis of estimate.

104. A computer implemented method of project planning as described in claim 102, wherein said step of tailoring said task content within said at least one content loaded project planning template comprises tailoring said outputs.

105. A computer implemented method of project planning as described in claim 102, wherein said step of tailoring said task content within said at least one content loaded project planning template comprises tailoring said inputs.

106. A computer implemented method of project planning as described in claim 102, wherein said step of tailoring said task content within said at least one content loaded project planning template comprises tailoring said guides.

107. A computer implemented method of project planning as described in claim 102, wherein said step of tailoring said task content within said at least one content loaded project planning template comprises tailoring said risks/risk mitigation.

108. A computer implemented method of project planning as described in claim 102, wherein said step of tailoring said task content within said at least one content loaded project planning template comprises tailoring said product measures and process measures.

109. A computer implemented method of project planning as described in claim 102, wherein said step of tailoring said task content within said at least one content loaded project planning template comprises tailoring said task progress.

110. A computer implemented method of project planning as described in claim 102, wherein said step of tailoring said task content within said at least one content loaded project planning template comprises tailoring said lessons learned.

111. A computer implemented method of project planning as described in claim 102, wherein said step of tailoring said task content within said at least one content loaded project planning template comprises tailoring said courses.

112. A computer implemented method of project planning as described in claim 90, wherein said step of accessing a task list comprises selecting a product development phase.

113. A computer implemented method of project planning as described in claim 112, wherein said step of selecting a product development phase comprises selecting from the group consisting of Concept Definition; System Definition; Design; Design Validation; Fabrication, Assembly, Integration, Test (FAIT); Production-Customer Support.

114. A computer implemented method of project planning as described in claim 112, further comprising the step of selecting a skill set.

115. A computer implemented method of project planning as described in claim 114, further comprising the step of selecting a task list.

116. A computer implemented method of project planning as described in claim 114, further comprising the step of selecting a task.

117. A computer implemented method of project planning as described in claim 90, further comprising generating links between said tailored task details.

118. A computer implemented method of project planning as described in claim 90, further comprising generating dependency between said tailored task details.

119. A computer implemented method of project planning as described in claim 90, further comprising the step of exporting said tailored task details from said computerized project planning tool to a computerized project scheduling tool.

120. A computer implemented method of project planning as described in claim 119, further comprising the step of populating said computerized project scheduling tool with said tailored task details.

121. A computer implemented method of project planning as described in claim 119, wherein said step of exporting said tailored task details from said computerized project planning tool to a computerized project scheduling tool further comprises the step of preserving links between said tailored task details during export to said computerized project scheduling tool.

122. A computer implemented method of project planning as described in claim 121, further comprising the step of preserving links between said tailored task details after populating said computerized project scheduling tool with said task details.

123. A computer implemented method of project planning as described in claim 122, further comprising the step of preserving links between said tailored task details upon deleting at least one tailored task detail.

124. A computer implemented method of project planning as described in claim 122, wherein said step of exporting said tailored task details from said computerized project planning tool to a computerized project scheduling tool further comprises the step of preserving dependency between said tailored task details during export to said computerized project scheduling tool.

125. A computer implemented method of project planning as described in claim 121, further comprising the step of preserving dependency between said tailored task details after populating said computerized project scheduling tool with said task details.

126. A computer implemented method of project planning as described in claim 121, further comprising the step of preserving dependency between remaining tailored task details after deleting at least one task detail.

127. A computer implemented method of project planning as described in claim 90, further comprising the step of assigning ownership of at least one task by said project planning tool user to another project planning tool user.

128. A computer implemented method of project planning as described in claim 90, further comprising the step of notifying said another project planning tool user of a task assignment.

129. A computer implemented method of project planning as described in claim 128, further comprising the step of adding additional task details to said task content by said another project planning tool user assigned said at least one task.

130. A computer implemented method of project planning as described in claim 129, further comprising the step of approving said additional task details.

131. A computer implemented method of project planning as described in claim 130, further comprising the step of filtering said content loaded tasks.

132. A computer implemented project planning system stored on a computer readable medium comprising:
  a) a plurality of task details responsive to at least one computerized project planning tool on a computer readable medium;
  b) an external database;
  c) an export element responsive to said project planning tool and said external database;
  d) an automatic population element which is responsive to said plurality of task details and said export element.

133. A computer implemented project planning system as described in claim 132, further comprising a link generator responsive to said plurality of task details.

134. A computer implemented project planning system as described in claim 133, wherein said link generator further comprises a link preservation element.

135. A computer implemented project planning system as described in claim 134, wherein said link preservation element acts automatically upon deleting a task detail.

136. A computer implemented project planning system as described in claim 132, further comprising a dependency generator responsive to a plurality of linked task details.

137. A computer implemented project planning system as described in claim 136, wherein said dependency generator further comprises a dependency preservation element.

138. A computer implemented project planning system as described in claim 137, wherein said dependency preservation element acts automatically upon deleting a task detail.

139. A computer implemented project planning system as described in claim 132, further comprising a task detail tailor element to which said task details are responsive.

140. A computer implemented project planning system as described in claim 139 wherein said task detail tailor element comprises an activity description tailor element.

141. A computer implemented project planning system as described in claim 139, wherein said task detail tailor element comprises a Basis of Estimate tailor element.

142. A computer implemented project planning system as described in claim 139, wherein said task detail tailor element comprises an output tailor element.

143. A computer implemented project planning system as described in claim 139, wherein said task detail tailor element comprises an input tailor element.

144. A computer implemented project planning system as described in claim 139, wherein said task detail tailor element comprises a guides tailor element.

145. A computer implemented project planning system as described in claim 139, wherein said task detail tailor element comprises a task progress tailor element.

146. A computer implemented project planning system as described in claim 139, wherein said task detail tailor element comprises a risks/risk mitigation tailor element.

147. A computer implemented project planning system as described in claim 139, wherein said task detail tailor element comprises a risks & lessons learned tailor element.

148. A computer implemented project planning system as described in claim 139, wherein said task detail tailor element comprises a process and product measures tailor element.

149. A computer implemented project planning system as described in claim 139, wherein said task detail tailor element comprises a courses tailor element.

150. A computer implemented project planning system as described in claim 132, further comprising a content loaded project planning template generator to which said plurality of task details are responsive.

151. A computer implemented project planning system as described in claim 150, wherein said content loaded project planning template generator generates a plurality of content loaded project planning templates.

152. A computer implemented project planning system as described in claim 151, and further comprising a hierarchical organizational element to which said plurality of content loaded project planning template generator are responsive.

153. A computer implemented project planning system as described in claim 152, wherein said hierarchical level arrangement element to which a plurality of content loaded project planning templates are responsive has a product development phase generator.

154. A computer implemented project planning system as described in claim 153, wherein said hierarchical level arrangement element is responsive a product development phase selected from the group consisting of Concept Definition; System Definition; Design; Design Validation; Fabrication, Assembly, Integration, Test (FAIT); and Production-Customer Support.

155. A computer implemented project planning system as described in claim 154, wherein said hierarchical level arrangement element to which a plurality of content loaded project planning templates are responsive further comprises a skill set generator.

156. A computer implemented project planning system as described in claim 155, wherein said hierarchical level arrangement element to which a plurality of content loaded project planning templates are responsive further comprises a task list generator.

157. A computer implemented project planning system as described in claim 132, and further comprising:
  a. an ownership assignment element; and
  b. a notification element which communicates with a task owner.

158. A computer implemented method of project planning, comprising the steps of:
  a) holding at least one task detail in at least one computerized project planning tool;
  b) exporting said at least one task detail from said at least one computerized project planning tool to at least one computerized project scheduling tool;
  c) populating said at least one computerized project scheduling tool automatically with said at least one task detail by said computerized project planning tool; and
  d) generating a project schedule having said at least one task detail automatically by said at least one computerized project scheduling tool.

159. A computer implemented method of project planning as described in claim 158, further comprising the step of generating links between more than one task detail by said computerized project planning tool.

160. A computer implemented method of project planning as described in claim 158, further comprising the step of generating dependency between more than one task detail by said computerized project planning tool.

161. A computer implemented method of project planning as described in claim 159, wherein said step of exporting said at least one task detail from said computerized project planning tool to said computerized project scheduling tool further comprises the step of preserving said links between said more than one task detail.

162. A computer implemented method of project planning as described in claim 160, wherein said step of exporting said at least one task detail from said computerized project planning tool to said computerized project scheduling tool further comprises the step of preserving said dependency between said more than one task detail.

163. A computer implemented method of project planning as described in claim 161, wherein the step of populating said at least one computerized project scheduling tool automatically with said at least one task detail by said computerized project planning tool further comprises the step of preserving said links between said more than one task detail within said computerized project scheduling tool.

164. A computer implemented method of project planning as described in claim 162, wherein the step of populating said at least one computerized project scheduling tool automatically with said at least one task detail by said computerized project planning tool further comprises the step of preserving said dependency between said more than one task detail within said computerized project scheduling tool.

165. A computer implemented method of project planning as described in claim 163, further comprising the step of preserving said links between said more than one task detail upon deleting a task detail within said computerized project scheduling tool.

166. A computer implemented method of project planning as described in claim 164, further comprising the step of preserving said dependency between said more than one task detail upon deleting a task detail within said computerized project scheduling tool.

167. A computer implemented method of project planning as described in claim 166, wherein said step of preserving dependency between said more than one task detail upon deleting said at least one task detail comprises generating at least one replacement dependency between the task details automatically by said project planning tool.

168. A computer implemented method of project planning as described in claim 167, wherein said step of holding said at least one task detail in at least one computerized project planning tool comprises holding said task detail in a content loaded project planning template.

169. A computer implemented method of project planning as described in claim 168, further comprising the steps of:
   a. prompting said at least one computerized planning tool user to tailor said at least one task detail;
   b. tailoring said at least one task detail; and
   c. generating at least one tailored task detail by said computerized planning tool.

170. A computer implemented method of project planning as described in claim 169, wherein said step of tailoring said at least one task detail of said at least one content loaded project planning template by said computerized project planning tool user comprises inputting activity descriptions.

171. A computer implemented method of project planning as described in claim 169, wherein said step of tailoring said at least one task detail of said at least one content loaded project planning template by said computerized project planning tool user comprises inputting a basis of estimate.

172. A computer implemented method of project planning as described in claim 169, wherein said step of tailoring said at least one task detail of said at least one content loaded project planning template by said computerized project planning tool user comprises inputting an outputs.

173. A computer implemented method of project planning as described in claim 169, wherein said step of tailoring said at least one task detail of said at least one content loaded project planning template by said computerized project planning tool user comprises inputting an inputs.

174. A computer implemented method of project planning as described in claim 169, wherein said step of tailoring said task details of said at least one content loaded project planning template by said computerized project planning tool user comprises inputting a guides.

175. A computer implemented method of project planning as described in claim 169, wherein said step of tailoring said task details of said at least one content loaded project planning template by said computerized project planning tool user comprises inputting risks/risk mitigation.

176. A computer implemented method of project planning as described in claim 169, wherein said step of tailoring said task details of said at least one content loaded project planning template by said computerized project planning tool user comprises inputting product measures.

177. A computer implemented method of project planning as described in claim 169, wherein said step of tailoring said task details of said at least one content loaded project planning template by said computerized project planning tool user comprises inputting process measures.

178. A computer implemented method of project planning as described in claim 169, wherein said step of tailoring said task details of said at least one content loaded project planning template by said computerized project planning tool user comprises inputting lessons learned.

179. A computer implemented method of project planning as described in claim 169, wherein said step of tailoring said task details of said at least one content loaded project planning template by said computerized project planning tool user comprises inputting courses.

180. A computer implemented method of project planning as described in claim 179, further comprising the step of arranging said content loaded project planning templates into hierarchical levels by the computer.

181. A computer implemented method of project planning as described in claim 180, wherein said step of arranging said content loaded project planning templates in a hierarchical levels by the computer further comprises the step of generating selectable product development phases.

182. A computer implemented method of project planning as described in claim 181, wherein said step of generating selectable product development phases comprises generating said selectable product development phases from the group consisting of Concept Definition; System Definition; Design; Design Validation; Fabrication, Assembly, Integration, Test (FAIT); Production-Customer Support.

183. A computer implemented method of project planning as described in claim 182, wherein said step of arranging said content loaded project planning templates in a hierarchical levels by the computer further comprises the step of generating skill sets.

184. A computer implemented method of project planning as described in claim 183, wherein said step of arranging said content loaded project planning templates in a hierarchical levels by the computer further comprises the step of generating task lists.

185. A computer implemented method of project planning as described in claim 184, wherein said step of arranging said content loaded project planning templates in a hierarchical levels by the computer further comprises generating a project planning task index.

186. A computer implemented method of project planning as described in claim 158, further comprising the step of assigning ownership of at least one content loaded task by said computerized project planning tool user to at least one other computerized project planning tool user.

187. A computer implemented method of project planning as described in claim 186, further comprising the step of notifying said other computer user of content loaded task assignment.

188. A computer implemented method of project planning as described in claim 187, further comprising the step of adding additional task details to said content loaded task by said at least one other computer user assigned said at least one content loaded task.

189. A computer implemented method of project planning as described in claim 188, further comprising the step of approving said additional task details.

190. A computer implemented method of project planning as described in claim 189, further comprising the step of filtering said content loaded tasks by said computer.

191. A computer implemented method of project planning, comprising the steps of:
 a) holding at least one task in at least one computerized project planning tool;
 b) prompting at least one computerized planning tool user by said computerized project planning tool to assign said task;
 c) assigning said task automatically by said at least one computerized planning tool user to at least one task owner;
 d) generating a content loaded project plan automatically by said at least one computerized project planning tool.

192. A computer implemented method of project planning as described in claim 191, further comprising the step of activating said at least one task.

193. A computer implemented method of project planning as described in claim 191, further comprising the step of notifying said at least one other computerized planning tool user of assignment of said at least one task.

194. A computer implemented method of project planning as described in claim 193, wherein said step of notifying said at least one other computerized planning tool user of assignment of said task further comprises the steps of:
 a. selecting a notification indicator generated by said computerized planning tool;
 b. selecting a assignment notification indicator generated by said computerized planning tool;
 c. building a list of said at least one other computerized planning tool user by e-mail addresses within said computerized planning tool;
 d. copying e-mail addresses to internal e-mail system automatically with said computerized planning tool; and
 e. sending notification of assigned task to said task owner.

195. A computer implemented method of project planning as described in claim 191, further comprises the steps of:
 a. filtering said at least one task held in said project planning tool;
 b. generating a filtered list of assigned tasks; and
 c. selecting at least one of said assigned task by said task owner.

196. A computer implemented method of project planning as described in claim 191, further comprises the step of tailoring said task details of said assigned task by said computerized project planning tool user.

197. A computer implemented method of project planning as described in claim 196, wherein said step of tailoring said task details of said assigned task by said task owner comprises tailoring activity descriptions.

198. A computer implemented method of project planning as described in claim 196, wherein said step of tailoring said task details of said assigned task by said task owner comprises tailoring said basis of estimate.

199. A computer implemented method of project planning as described in claim 196, wherein said step of tailoring said task details of said assigned task by said task owner comprises tailoring said outputs.

200. A computer implemented method of project planning as described in claim 196, wherein said step of tailoring said task details of said assigned task by said task owner comprises tailoring said inputs.

201. A computer implemented method of project planning as described in claim 196, wherein said step of tailoring said task details of said assigned task by said task owner comprises tailoring said guides.

202. A computer implemented method of project planning as described in claim 196, wherein said step of tailoring said task details of said assigned task by said task owner comprises tailoring said risks/risk mitigation.

203. A computer implemented method of project planning as described in claim 196, wherein said step of tailoring said task details of said assigned task by said task owner comprises tailoring said process and product measures.

204. A computer implemented method of project planning as described in claim 196, wherein said step of tailoring said task details of said assigned task by said task owner comprises tailoring said task progress.

205. A computer implemented method of project planning as described in claim 196, wherein said step of tailoring said task details of said assigned task by said task owner comprises tailoring said lessons learned.

206. A computer implemented method of project planning as described in claim 196, wherein said step of tailoring said task details of said assigned task by said task owner comprises tailoring said courses.

207. A computer implemented method of project planning as described in any one of claims 191, further comprising the step of validating data by said computerized planning tool.

208. A computer implemented method of project planning as described in claim 207, further comprising the step of approving tailored task details.

209. A computer implemented method of project planning as described in claim 191, further comprising the step of exporting said task details from said at least one computerized project planning tool to at least one computerized project scheduling tool.

210. A computer implemented method of project planning as described in claim 209, further comprising the step of populating said at least one computerized scheduling tool with said task details by said computerized planning project tool.

211. A computer implemented method of project planning as described in claim 210, further comprising the step of generating links between task details by said computerized project planning tool.

212. A computer implemented method of project planning as described in claim 210, further comprising the step of generating dependency between task details by said computerized project planning tool.

213. A computer implemented method of project planning as described in claim 211, wherein said step of exporting said task details from said computerized project planning tool to said computerized project scheduling tool further comprises the step of preserving said links between said more than one task detail.

214. A computer implemented method of project planning as described in claim 212, wherein said step of exporting said at least one task detail from said computerized project planning tool to said computerized project scheduling tool further comprises the step of preserving said dependency task details.

215. A computer implemented method of project planning as described in claim 211, wherein the step of populating said at least one computerized project scheduling tool automatically with said at least one task detail by said computerized project planning tool further comprises the step of preserving said links between said task details within said computerized project scheduling tool.

216. A computer implemented method of project planning as described in claim 214, wherein the step of populating said at least one computerized project scheduling tool automatically with said at least one task detail by said computerized project planning tool further comprises the step of preserving said dependency between said task details within said computerized project scheduling tool.

217. A computer implemented method of project planning as described in claim 195, further comprising the step of preserving said links between said task details upon deleting a task detail within said computerized project scheduling tool.

218. A computer implemented method of project planning as described in claim 216, further comprising the step of preserving said dependency between said task detail upon deleting a task detail within said computerized project scheduling tool.

219. A computer implemented method of project planning as described in claim 218, wherein said step of preserving dependency between said more than one task detail upon deleting said task details comprises generating at least one replacement dependency between the remaining task details automatically by said project planning tool.

220. A computer implemented project planning system stored on a computer readable medium comprising:
  a) a content loaded task memory element;
  b) a prompt element which is responsive to said content loaded task memory element;
  c) an assignment element which is responsive to said prompt element and which communicates with at least one computer user; and
  d) an automatic content loaded project plan generator which generates at least one content loaded project plan on a computer readable medium.

221. A computer implemented project planning system as described in claim 220, and further comprising a content loaded task activator.

222. A computer implemented project planning system as described in claim 220, and further comprising a notification element which communicates with at least one other computerized planning tool user and which is responsive to said assignment element.

223. A computer implemented project planning system as described in claim 222, wherein said notification element comprises:
  a. a notification icon selection element;
  b. an assignment notification icon selection element;
  c. an e-mail address list element;
  d. an automatic e-mail address copy element to which is automatically responsive an internal e-mail system;
  e. an automatic e-mail task assignment notification element.

224. A computer implemented project planning system as described in claim 220, and further comprising a task detail addition element.

225. A computer implemented project planning system as described in claim 224, and further comprising:
  a. a task owner prompt element having task detail input capability;
  b. a task detail selection element which is responsive to said task owner prompt element;
  c. a task detail input element which is responsive to said task detail selection element.

226. A computer implemented project planning system as described in claim 225, wherein said task detail selection element selects task detail from a group of task detail menus consisting of Basis of Estimate, Outputs, Inputs, Guides, Risks & Lessons Learned.

227. A computer implemented project planning system as described in claim 226, wherein said task detail selection element comprises a Basis of Estimate tailor element and further comprising an input prompt element to which said Basis of Estimate input element is responsive.

228. A computer implemented project planning system as described in claim 226, wherein said task detail selection element comprises an output selection element and further comprising an input prompt element to which said output selection element is responsive.

229. A computer implemented project planning system as described in claim 226, wherein said task detail selection element comprises an input selection element and further comprising an input prompt element to which said input selection element is responsive.

230. A computer implemented project planning system as described in claim 226, wherein said task detail selection element comprises a guide selection element and further comprising an input prompt element to which said guide selection element is responsive.

231. A computer implemented project planning system as described in claim 226, wherein said task detail selection element comprises a risks & lessons learned selection element and further comprising an input prompt element to which said risks & lessons learned selection element is responsive.

232. A computer implemented project planning system as described in claim 227, and further comprising a data validation element.

233. A computer implemented project planning system as described in claim 232, and further comprising an additional task detail approval element.

234. A computer implemented project planning system as described in claim 223, and further comprising a non-labor total costs calculator.

235. A computer implemented project planning system as described in claim 220, and further comprising an export element which is responsive to at least one computerized-project scheduling tool.

236. A computer implemented project planning system as described in claim 235, and further comprising an automatic population element which is responsive to at least one computerized project scheduling tool.

237. A computer implemented method of project planning as described in claim 236 and further comprising an automatic content loaded task integrator which is responsive to at least one computerized scheduling tool.

* * * * *